United States Patent [19]
Linzer

[11] Patent Number: 6,091,776
[45] Date of Patent: Jul. 18, 2000

[54] DELAY BALANCED VIDEO ENCODER SYSTEM

[75] Inventor: Elliot N. Linzer, Bronx, N.Y.

[73] Assignee: C-Cube Microsystems, Inc., Milpitas, Calif.

[21] Appl. No.: 09/084,690

[22] Filed: May 26, 1998

[51] Int. Cl.[7] .............................. H04N 7/12; H04B 1/66
[52] U.S. Cl. .......................... 375/240; 348/409; 348/96; 348/415
[58] Field of Search .............................. 348/409, 96, 419, 348/430, 407, 443, 384, 387, 401, 416; 375/240; H04N 7/12; H04B 1/66

[56] References Cited

U.S. PATENT DOCUMENTS

| | | | |
|---|---|---|---|
| 5,574,504 | 11/1996 | Yagasaki et al. | 348/415 |
| 5,761,398 | 6/1998 | Legall | 348/409 |
| 5,821,991 | 10/1998 | Kwok | 348/96 |
| 5,878,166 | 3/1999 | Legall | 348/409 |

*Primary Examiner*—Richard Lee
*Assistant Examiner*—Gims Philippe
*Attorney, Agent, or Firm*—Proskauer Rose, LLP

[57] ABSTRACT

A process and apparatus for encoding are provided, wherein fields of a digital signal are processed to detect repeat fields. Adjacent pairs of the non-repeated fields are organized into frames. A determination is made whether to encode each of the frames as an intraframe, a predicted frame or a bidirectionally predicted frame. The frames are encoded in a specific, predefined order relative to the order of capture of the frames and the type of frame. After each bidirectionally predicted frame that immediately precedes one of the detected repeat fields, encoding of a frame is delayed for one field time. Encoding is paused after encoding each reference frame that is the very next reference frame to be encoded after a second reference frame, which second reference frame immediately precedes one of the detected repeat fields. A process and apparatus for statistically multiplexing multiple encoded digital video signals are also provided. Statistics are gathered for one or more of the encoded digital video signals and bit rates are allocated for transmitting one or more of the digital video signals as encoded. One of the digital video signals is encoded to produce a certain number of bits for each encoded picture in accordance with a decoder buffer model having a predefined size and filling at a certain bit rate, which is updated with the bit rate allocated to the one digital video signal. The update is delayed by a number of field display times depending on the number of times encoding pauses, and a presumed number of times decoding pauses, as a result of the detected repeat fields.

14 Claims, 16 Drawing Sheets

DELAY BALANCED VIDEO ENCODER SYSTEM

RELATED APPLICATIONS

This application is assigned to the same assignee as the following application which contains related subject matter:

U.S. patent application Ser. No. 08/775,313, entitled "Statistical Multiplexed Video Encoding Using Pre-encoding a Priori Statistics and a Posteriori Statistics," filed on Dec. 31, 1996 for Elliot Linzer and Aaron Wells.

The contents of the above-listed application are incorporated herein by reference.

FIELD OF THE INVENTION

The present invention pertains to real-time video encoding, such as is defined in the MPEG-2 standard. More particularly, the present invention pertains to encoding video signals so as to achieve a truly constant encoding to decoding delay.

BACKGROUND OF THE INVENTION

In a broadcast environment, it is some times desirable to encode (compress) video signals of multiple video programs in real time and then multiplex or combine the encoded video signals together. The combined encoded video signals are then broadcast to one or more receivers which are capable of demultiplexing out a desired one of the video programs, including the desired encoded video signal. The receiver then decodes the video signal (and possibly associated audio signal(s), an associated closed captioned text signal, a private data signal, etc.) and presents (displays) the decoded video signal.

Video signals are preferably encoded using an encoding technique such as MPEG-1 or MPEG-2. Such encoding techniques produce a variable amount of encoded data for each picture (frame or field) of the video signal. The amount of encoded data produced for each picture depends on a number of factors including the amount of motion between the to-be-encoded picture and other pictures used as references for generating predictions therefor. For example, a video signal depicting a football game tends to have high motion pictures and a video signal depicting a talk show tends to have low motion pictures. Accordingly, the average amount of data produced for each picture of the football game video signal tends to be higher than the average amount of data produced for each picture of comparable quality of the talk show. The allocation of bits from picture to picture or even within a picture may also be controlled to generate a certain amount of data for that picture. Consider that the amount of data for each picture may vary. However, the buffer at the decoder has a finite storage capacity. When encoding a video signal, a dynamically adjusted bit budget may be set for each picture to prevent overflow and underflow at the decoder buffer given the transmission bit rate, the storage capacity of the decoder buffer and the fullness of the decoder buffer over time. Note that varying the number of bits that can be allocated to a picture impacts the quality of the pictures of the video signal upon decoding.

In general, the transmission medium over which the multiplexed encoded video signals are transmitted has a finite transmission bit rate. It is desirable to share this transmission bit rate amongst the different video signals that are multiplexed together. One manner of doing so is to simply allocate fixed sized fractions of the total transmission capacity to each video signal. However, as noted above, the amount of data produced for each picture of each video signal tends to vary depending on the content thereof and from moment to moment. This would tend to produce low motion video signals with unnecessarily high quality and high motion video signals with poor quality.

A preferred real-time video encoding system 10 is shown in FIG. 1. This video encoding system 10 is described in greater detail in U.S. patent application Ser. No. 08/775,313. As shown, digital video signals are produced from k>1 sources 12-1, 12-2, . . . , 12-k. The video sources 12-1 to 12-k can be video tape recorders, magnetic or optical discs, cameras or the like. Each digital video signal is received at a respective encoder 14-1, 14-2, . . . , 14-k. Each encoder 14-1 to 14-k encodes the video signal received thereat and outputs an encoded video signal to the multiplexer 16. The multiplexer 16 multiplexes the encoded video signals together to produce an output signal.

In the encoding of the video signals, each encoder 14-1 to 14-k can generate statistical data regarding the complexity of encoding its respective video signal. Such complexity statistics can be a priori (pre-encoding) statistics and/or a posteriori (or post encoding) statistics. Examples of such statistics include measures of inter-pixel differences or the actual number of bits needed to encode a picture.

These statistics are outputted from each encoder 14-1 to 14-k to a statistics computer 18. The statistics computer 18 uses the measure of encoding complexity of each encoder 14-1 to 14-k as a basis to allocate a fraction of the transmission bit rate of the transmission channel to each encoder 14-1 to 14-k, e.g., so as to equalize the picture quality over all of the encoders 14-1 to 14-k. Thus, an encoder 14-1 which encodes a video signal with a high encoding complexity can be allocated a higher bit rate than an encoder 14-2 which encodes a video signal with a low encoding complexity. This tends to equalize the quality of all of the encoded video signals that are multiplexed together. To allocate the bit rates, the statistics computer 18 can transfer an indication of a bit rate to each encoder 14-1 to 14-k. Each encoder 14-1 to 14-k responds to an indication of an allocated bit rate by accordingly adjusting the number of bits produced for each picture in an effort to meet the allocated bit rate. Preferably, statistics are provided periodically from the encoders 14-1 to 14-k to the statistics computer 18 and indications of periodically allocated bit rates are transferred periodically from the statistics computer 18 to the encoders 14-1 to 14-k.

As noted above, each encoder 14-1 to 14-k encodes each picture in order to generate a certain number of bits for that picture according to a bit budget for that picture. Furthermore, the bit budget is set to prevent a decoder buffer underflow or overflow given a certain transmission channel bit rate. In order to prevent decoder buffer underflow and overflow, the encoder models the decoder buffer in order to determine the fullness of the decoder's buffer from time to time. The behavior of the decoder buffer is now considered in greater detail.

FIG. 2 illustrates a model of a decoder buffer for a sequence of pictures. A sequence of pictures is assigned a picture type, namely, intracoded or I, predictively coded or P or bidirectionally predictively encoded or B. I pictures are spatially only encoded. P pictures are temporally encoded and spatially encoded wherein predictions for encoding P pictures originate from only previous P or I reference pictures. B pictures are temporally and spatially encoded wherein predictions for B pictures may originate from previous and/or subsequent I or P reference pictures. Predictions must be obtained from decoded, reconstructed versions of the reference I or P pictures according to the MPEG-2 standard. (This ensures that the encoder uses the same prediction as is available to the decoder.) As such, the encoding of each B picture, e.g., pictures B0 and B1, is delayed until the subsequent reference picture, namely, I2, is encoded, even though such a reference picture is presented (displayed) later. Pictures are decoded in the same order that they are encoded.

In modeling the decoder buffer, the encoder determines the buffer fullness of the decoder buffer. The encoder can know how many bits are present in the decoder buffer given the allocated transmission channel bit rate at which such pictures are transmitted to the decoder buffer, the delay between encoding a picture at the encoder and decoding a picture at the decoder, and the knowledge that the decoder buffer is assumed to remove the next to be decoded picture instantaneously at prescribed picture intervals. For example, as depicted, at time interval A, the allocated bit rate is R1 bits/second, at time interval B, the bit rate is R2 bits/second and at time interval C, the allocated bit rate is R3 bits/second. The number of bits produced for each picture I2, B0, B1, P5, B3, B4, P8, B5, B6, P11, B9, B10 and I14, is b1, b2, b3, b4, b5, b6, b7, b8, b9, b10, b11, b12 or b13, respectively. The encoder attempts to determine each maxima and minima of the decoder buffer's fullness which correspond to the number of bits in the buffer immediately before the decoder removes a picture and the number of bits in the buffer immediately after the decoder removes a picture, respectively. Given such information, the encoder can determine the number of bits to allocate to successive pictures to prevent decoder buffer underflows (decoder buffer does not have all of the bits of a picture in time for the decoder to decode them at a predefined decode time) or overflows (decoder buffer fullness exceeds the maximum decoder buffer storage capacity of $B_{max}$ bits).

As shown in FIG. 2, the encoder typically further restricts the number of bits produced during encoding to prevent the decoder buffer fullness from falling below a threshold $b_{lo}$ or exceeding a threshold $b_{hi}$. The reasons for this pertains to inaccuracies in the encoder's model of the decoder's buffer fullness, for example, as caused by a variation in the delay between encoding each picture and decoding each picture. Such variations can occur when the original source video signal contains repeat fields, as occurs when the video signal is produced from film using the 3:2 pull-down technique. Specifically, to match the film rate of 24 frames per second to the NTSC video signal rate of 60 fields per second, some (approximately every other) film frame is converted to three fields instead of two, where the third field is a duplicate or repeat of the first field of that film frame.

According to MPEG-2, repeated fields can be entirely eliminated from the encoded video signal and substituted with a flag (called the "repeat_first_field" flag) which causes the decoder to repeat a designated field of the decoded, reconstructed video signal. FIG. 3 illustrates an illustrative encoder 14 for encoding a video signal that can include repeat fields. A video signal outputted from a video source 12 is processed by a inverse teleciner 21 to detect and discard repeat fields. Next, a frame organizer and type selector 23 determines whether each frame is an I frame, P frame or B frame, aggregates adjacent non-repeated fields into frames, and reorders the frames according to the appropriate encoding order. Finally, a compressor 25 compresses the video signals according to the selected order. Illustratively, the inverse teleciner 21, frame organizer and type selector 23 and compressor 25 are implemented using one or more processors, such as the DV Expert™ encoder distributed by C-Cube Microsystems, Inc.™, a company located in Milpitas Calif. Such a processor actually includes multiple processing sections, such as a RISC processor, a motion estimator, and a video digital signal processor, on a single integrated circuit. A single such integrated circuit, or multiple integrated circuits of this type working in concert, may be used to perform such processing.

FIG. 4 illustrates a sample timing relationship between capture (i.e., input) of the unencoded digital video signal at the encoder 14 (more specifically to the inverse teleciner 21), repeat field detection by the inverse teleciner 21 and encoding by the compressor 25. As shown, a sequence of 40 fields is outputted from the video source 12 labeled 0 to 39. Using one of a number of well known techniques, the captured fields are processed to identify repeat fields. As indicated by letters "N", fields 2, 4, 6, 8, 10, 15, 20, 25, 30, 35 and 40 are not detected as repeat fields. As indicated by letters "Y", fields 12, 17, 22, 27, 32 and 37 are detected as repeat fields. Adjacent pairs of fields are combined into frames as indicated, except in the case that a repeat field is detected. In such a case, the repeat field is discarded, i.e., not encoded.

The discarding of repeat fields allows the encoder to increase the number of bits available for allocation to the remaining pictures (or allows reducing the bit rate allocated to the encoded video signal for a given quality). In place of the discarded repeat field, the encoder sets the repeat_first_field flag. The decoder decodes the encoded frames from the encoded video signal and, in response to detecting the set repeat_first_field flag, simply repeats display of an appropriate one of the fields of the previously decoded and reconstructed frames.

The encoder must pause for one field time for every discarded repeat field so that the encoder does not run out of pictures to encode. MPEG-2 does not specify precisely when pausing should occur and conventional encoders tend to pause at different times. According to the technique shown in FIG. 4, as soon as the encoder detects that the next to-be-encoded frame precedes a repeat field, the encoder encodes the non-repeated fields of the frame and then pauses encoding for one field time. For example, as shown in FIG. 4, frame I2 is encoded, followed immediately by encoding frames B0, B1 and P5. However, because the field immediately following frame P5 is a repeat field (and therefore is discarded), the encoder pauses for one field time before resuming encoding of frame B3. Likewise, after encoding frame B3, the encoder immediately encodes frame B4. However, because a repeat field is detected immediately following frame B7 while encoding frame B4, the encoder pauses for one field time after encoding frame B4. As shown, encoding pauses after each of frames P5, B4, B6, P11, B10, and B12. This manner of pausing the encoding operation is referred to herein as the immediate stall technique. The encoder in FIG. 4 has a single frame pipeline because only a single frame time is needed for a frame to complete processing in the compressor 25. Thus, this encoder is more precisely referred to as an immediate stall/single stage pipeline encoder.

FIG. 5 illustrates the timing associated with capture, repeat field detection and encoding for a three frame pipeline encoder. In this encoder, two successive motion estimation search stages or steps ME1 and ME2 are performed successively on each frame, followed by a final encoding stage. Each of the motion estimation search stages ME1 and ME2 (nominally) requires one frame time to complete for each frame, and the final encoding stage requires one frame time.

As such, each frame requires three frame times to complete processing in the compressor 25 portion of the encoder. Each stage ME1, ME2 and the final encoding stage simultaneously pause encoding for one field time immediately upon detecting a repeat field. However, this corresponds to different frames at each stage. For example, upon detecting a repeat field following the frame P5, the stage ME1 immediately pauses for one field time. The stage ME2 also pauses at the same time. However, the frame ME2 pauses after processing the immediately preceding frame B1. Likewise, the final encoding stage also pauses at the same time as the stages ME1 and ME2. However, this corresponds to the time immediately following the processing of the frame B0 in the final encoding stage. As such, the one field pauses are shifted back in the encoded sequence of frames by one frame time for each additional stage (or a total of two frame times) in comparison to the encoding pauses shown in FIG. 4. Thus, using the same repeat field detection pattern, the encoding pauses after frames, B0, P5, B4, B6, P11 and B10 for the immediate stall/three frame pipeline encoder.

FIG. 6 illustrates the capture, repeat field detection and encoding timing relationship for a single frame pipeline encoder employing a delayed stall manner of encoding. In this encoder, encoding does not pause immediately upon detecting a repeat field but rather is delayed. Specifically, upon detecting a repeat field, encoding of frames continues until the next to-be-encoded reference frame (P frame or I frame). As may be appreciated, this corresponds to the moment in time at which the encoder exhausts all to-be-encoded frames that have completed inverse telecine processing. The encoding then pauses one field time for each repeat field detected between reference frames. For example, using the same repeat field sequence as in FIGS. 4 and 5, a repeat field is detected following frame P5. However, encoding does not pause. Rather, previously inverse telecine processed, reordered B frames B3 and B4 are encoded. Note that while encoding frame B4, yet another repeat field is detected following frame B7. As such, immediately before encoding frame P8, encoding pauses for two field times, i.e., one field time for each of the two detected repeat fields following frame P5 and frame B7. Such a pausing is needed to complete inverse telecine processing of fields 18 and 19 of frame P8. Encoding then continues for frames P8, B6 and B7. Note that while encoding frame B6, another repeat field is detected following frame B9. Nevertheless, encoding continues and does not pause until immediately before encoding frame P11. Again, the pausing is furthermore needed to complete inverse telecine processing of field 26 of frame P11 so that frame P11 is available for encoding.

The behavior of the delayed stall encoder can be analyzed as follows. Each frame is encoded as soon as possible. Any discarded repeat fields that delay capture of a reference frame delays encoding of such a reference frame. The encoding of B frames, on the other hand, is delayed only as is necessary to encode the subsequent reference frame.

FIG. 7 illustrates the capture, repeat field detection and encoding timing of a delayed stall/three frame pipeline encoder. As in the delayed stall/single frame pipeline encoder (the behavior of which is described in FIG. 6), when a repeat field is detected, encoding does not pause immediately. Rather, any available frames are encoded. Pausing occurs only inasmuch as is needed to obtain the data of the next reference frame. This same behavior occurs at each stage. That is, upon detecting the first repeat field following frame P5, the ME1 stage continues to process available frames. Nor does detecting a repeat field after frame B7 pause processing at the ME1 stage. Rather, processing continues in the ME1 stage until after the frame B4 at which point the ME1 stage pauses until the fields 18 and 19 of the next to-be-encoded reference frame, namely, the reference frame P8, have completed inverse telecine processing. This requires two field times as shown. The same behavior is performed by the ME2 search stage. Specifically, processing does not pause immediately upon detecting repeat fields following frames P5 or B7 but rather continues until the stage ME2 must wait for data to be available, i.e., when the ME1 stage has completed processing the frame P8. As noted, the ME1 stage pauses (in this case, for two field times) prior to processing the frame P8 which in turn causes the ME2 stage to pause, albeit, at a different point in time than the ME1 stage, until the frame P8 is available for processing. The same is true for the final encoding stage. As such, encoding pauses at the same pictures and for the same durations in the delayed stall/three frame pipeline encoder as in the delayed stall/single frame pipeline encoder.

FIG. 8 illustrates the timing associated with decoding and presentation of pictures at a decoder. As shown, the frames are decoded in the order I2, B0, B1, P5, B3, B4, . . . etc. A real-time decoder is capable of decoding each frame in one frame time. To reduce memory requirements, and to also enable separate display of each field of each frame, the decoder preferably begins display of a B frame about halfway through decoding of the B frame. On the other hand, reference frames, namely P and I frames, are not displayed until about half of the very next to-be-decoded reference frame is decoded. When displaying a repeat field, the decoder will pause decoding.

This behavior is demonstrated in FIG. 8. First, frame I2 is decoded. Next, frames B0 and B1 are decoded using I2 as a reference picture. Presentation of frame B0 begins when about half of the frame B0 is decoded. Likewise presentation of frame B1 begins when about half of frame B1 is decoded.

Next, frame P5 is decoded. At the time that presentation of frame B1 is complete, half of frame P5 is decoded. Thus, presentation of frame I2 can begin. After this, frames B3 and B4 are decoded using frames I2 and P5 as references. As above, presentation of the frame B3 begins when half of frame B3 is decoded and presentation of frame B4 begins when about half of frame B4 is decoded.

Next frame P8 is decoded. At the completion of presentation of frame B4, about half of frame P8 has been decoded. As such, presentation of frame P5 begins. Frame P5 includes a set repeat_first_field flag for causing the repeated display of field 10 as field 12. When field 10 is displayed during the field time for field 12, decoding pauses until the display of field 10 in the field time of field 12 is complete. Decoding then resumes with frames B6 and B7 using frames P5 and P8 as references. Frames B6 and B7 are presented, wherein frame B7 has a set repeat_first_field flag causing field 15 of frame B7 to be displayed a second time during the field time for field 17. Again this causes the decoder to pause decoding for one field time, namely, during the field time for field 17.

The net result is that seamless presentation of decoded, reconstructed video frames and fields are achieved. In this example, decoding pauses after each of frames P8, B7, B9, P14 and B13 for one field time.

Compare now the encoding timing of the encoders shown in FIGS. 4–7 with the decoding timing shown in FIG. 8. None of the conventional encoders always pauses its encoding in between precisely the same frames as does the decoder.

It is not a requirement of MPEG-2, but nevertheless desirable for sake of modeling the decoder buffer, for the delay between encoding and decoding to be constant. (Note that even when the transmission rate is constant, the number of bits in each picture will vary. As such, the number of pictures buffered at the encoder will vary over time as will the number of pictures buffered at the decoder.) However, since conventional encoders do not pause encoding when repeat fields are detected in between the same frames as the decoders pause decoding while repeating corresponding fields, the delay between encoding and decoding individual frames varies. Note that the delay between encoding and decoding will remain constant if repeat fields are never detected.

For example, FIG. 9 shows the encoding and decoding timing relationship assuming that the video frames are encoded using the immediate stall/three frame pipeline encoder of FIG. 5. Suppose that the delay between encoding a picture and decoding that same picture will be n field times (n being a real number >0) if repeat fields are never detected. Because no repeat fields are detected through the encoding of picture I2, the delay between the encoding and decoding of frame I2 is n field times. The same is true for the frame B0. However, there is a one field delay between encoding frame B0 and encoding frame B1 but no delay between decoding these two frames. As such, the delay between encoding frame B1 and decoding frame B1 is n−1 fields. The encoding to decoding delay for frame P5 is also n−1 fields. The encoder pauses again for one field time between encoding frame P5 and encoding frame B3. However, the decoder does not pause at this same point in the sequence of frames. Thus, the encoding to decoding delay for the frame B3 is n−2 fields. The encoding to decoding delay for frame B4 is also n−2 fields. After encoding field B4, encoding pauses for another field time. Again, decoding does not pause between decoding frames B4 and P8 and thus the encoding to decoding delay for frame P8 is n−3 fields. Finally, the decoder pauses between decoding frame P8 and decoding frame B6. There are no pauses in encoding between these frames. Thus, the encoding to decoding delay for frame B6 is only n−2 fields. In short, the encoding to decoding delay using the aforementioned immediate stall/three frame pipeline encoder varies between n and n−3 fields. More generally stated, if the spacing between reference pictures is M pictures, and the number of stages in the encoder pipeline is S, then the encoding to decoding delay variation is n to n−r(M+S−1), where r(y) is the maximum number of times the encoder will set the repeat_first_field flag in y consecutively captured frame pictures. Although the MPEG-2 standard allows for the repeat_first_field flag to be set every frame (r(y)=y), a typical encoder will not set the repeat_first_field flag in any two consecutively captured frames. This is because the conventional 3:2 pull-down process adds one repeat field every other frame. In this latter case, the variation in delay will be between n and n−⌈(M+S−1)/2⌉ fields (where "⌈x⌉" denotes the "ceiling of x," i.e., x if x is an integer and the integer portion of x+1 otherwise). In the above example, M=3 and S=3 and thus the encoder to decoder delay is n to n−3 fields. However, in an encoder that can produce an arbitrary repeat_first_field pattern, the variation may be as many as M+S−1 fields, namely, 5 fields for M=S=3.

FIG. 10 shows the timing relationship between the delayed stall/single frame pipeline encoder or delayed stall/three frame pipeline encoder shown in FIGS. 6–7. The derivation of the encode to decode delays is only briefly described here. Specifically, encoding pauses for two field times between frames B4 and P8 but decoding does not pause until after decoding frame P8 (and then pauses for only one field time). Thus, while the encoding to decoding delay of frames I2, B0, B1, P5, B3 and B4 are each n fields, the encoding to decoding delay for the frame P8 is n−2 fields. Decoding pauses before frame B6 for one field time but encoding does not pause until frame P11. Thus, the encoding to decoding delay for frames B6 and B7 is n−1 fields, and so on. In short, the encoding to decoding delay over the sequence of pictures previously described for the delayed stall pipeline encoder is between n and n−2 fields. More generally stated, the variation in encoding to decoding delay is n to n− the maximum number of repeat fields in a sequence of M pictures (where M is the picture spacing between reference frames). If the encoder does not set the repeat field flag in two consecutively captured frames, the variation in delay will be between n and n−⌈M/2⌉ fields. However, for an encoder that can produce an arbitrary repeat_first_field pattern, the variation will be between n and n−M fields.

Consider that encoded frame data is preferably transmitted as a frame-wise contiguous stream, irrespective of any encoding or decoding pauses. In the decoder buffer model, the decoder is envisioned as filling at a piece-wise constant bit rate (namely, the bit rate allocated to a respective portion of the encoded video signal). The decoding of a picture by the decoder is delayed from the encoding of the same picture by the above noted encoding-to-decoding delay time, which can vary depending on the detection of repeat fields and the encoding pausing policy of the encoder. However, prior to encoding a given picture, an encoder must be able to deduce (from its model of the decoder buffer) the fullness of the decoder buffer prior to decoding the same picture (in order to determine the bit budget for that picture). Therefore, the statistics computer 18 (FIG. 1) will allocate the bit rates r1, r2, . . . rk to the encoders 14-1 to 14-k, and the encoders 14-1 to 14-k will update their decoder buffer models with such allocated bit rates after a delay of d field times, where d is a non-negative real number. Relative to the encoder's model of the decoder buffer (which, in the absence of encoding and decoding pauses, is presumed in the conventional encoders to decode each picture n field times after the encoder encodes it), the encoder implements the bit rate after a delay of n+d field times. See M. Perkins & D. Arnstein, *Statistical Multiplexing of Multiple MPEG-2 Video Programs in a Single Channel*, SMPTE J., vol. 104, no. 9, p. 569–599, September, 1995. If an encoder behaves in such a manner but the actual encode to decode delay is not n, then the encoder's model of the decoder buffer will not be accurate.

To illustrate this, consider as an example a case where d=0 and the statistic computer 18 allocates a new bit rate R1 to an encoder 14-2 representing a bit rate at which the decoder buffer fills just after frame B4 is decoded (the bit rate previously having been R0) and then allocates a new bit rate R2 to the encoder 14-2 representing a bit rate at which the decoder buffer fills just after frame B6 is decoded. Assume that the encoder 14-2 is a delayed stall type of encoder (the behavior of which is illustrated in FIGS. 6 and 7). FIG. 18 is a timing chart illustrating the curve C1 of the fullness of the encoder's model of the decoder's buffer superimposed on the curve C2 actual fullness of the decoder's buffer. The first bit rate change is received at the encoder approximately n field times before frame B4 is decoded, i.e., approximately when frame B4 is encoded. As shown, the encoder correctly changes its model of the decoder buffer to use the bit rate R1 after frame B4 is removed from the decoder buffer. The second bit rate change is received four field times later, i.e., n field times before frame B6 is decoded. As noted above, the encoder delays encoding the frame P8 until four field times later as a result of two repeat field triggered pauses. Accordingly, the encoder changes the bit rate at which its model of the decoder buffer fills to R2 after picture P8 is removed. In contrast, the decoder decodes the frame P8 only two field times after the frame B6 is decoded. As such, the decoder changes its bit rate to R2 after the frame B6 is removed. The net effect is that the fullness of the encoder's model of the decoder buffer diverges from the actual decoder buffer fullness after frame P8 is removed from the decoder buffer.

Conventional encoders behave as depicted in one of the FIGS. 4–7, i.e., with variable encode to decode delay. As noted above, variations in encode to decode delay cause the encoder's model of the decoder buffer fullness to diverge from the actual buffer fullness. Left unchecked, this divergence will cause the decoder buffer to overflow or underflow. To keep the decoder buffer from underflowing, a conventional encoder will normally delay updating its model of the decoder buffer with each rate increase allocated by the statistics computer by an amount of time equal to at least the maximum possible variation in encode-to-decode delay. As can be appreciated, such an approach would have prevented an encoder from modeling the decoder buffer fullness higher than the actual buffer fullness in, for example, the illustration of FIG. 18. However, such an approach generally causes the encoder's model of the decoder's buffer to be less full than the actual decoder buffer fullness. For example, when a rate increase is allocated to the encoder and the encode to decode delay is not decreasing (i.e., the encode to decode delay is constant or is increasing), or when a rate decrease is allocated to the encoder and the encode to decode delay decreases, the encoder's model of the decoder's buffer will be less full than the actual fullness of the decoder buffer. This inaccuracy will lead the encoder to use fewer bits than possible—an underestimate of the decoder buffer fullness by x bits will cause x bits to be wasted. In a conventional encoder, decoder buffer underflows are avoided by monitoring the encoder buffer fullness (which in a sense mirrors the decoder buffer fullness) and by substituting transmission of null data instead of useful data (e.g., compressed picture data or header/control data) when the encoder buffer is too empty. (Null data is typically transmitted as null transport packets, which are discarded before entering the decoder's compressed video data buffer.) With these methods used by conventional encoders to insure buffer compliance with the variable bit rate (e.g., statistical multiplexing) situations, the encoder periodically encodes pictures using bit allocations that are calculated assuming a lower transmission bit rate than will actually be used, and a considerable fraction of the transmitted data will be null data. Because fewer bits are spent to represent the video signal, the quality of the video (after decoding) is reduced.

Moreover, a conventional encoder may model the real-time behavior of the decoder buffer fullness in part by measuring the fullness of an output buffer at the encoder which temporarily stores encoded pictures pending transmission. (This may even be done in a constant bit rate system, e.g., where statistical multiplexing is not used, because of the drift between the synchronization of the video picture timing and the channel transmission. That is, a decoder buffer model based solely on the number of bits used in each picture, the number of fields produced per second and the number of bits transmitted per second will be inaccurate considering that the synchronization of the occurrence of the fields is drifting relative to the channel slots in which bits are transmitted.) However, the encoder buffer fullness only provides an accurate mirror image of the decoder buffer fullness when the encoding to decoding delay is constant. Specifically, in the encoder buffer model, the bits of each encoded picture are presumed to be inserted into the encoder buffer instantly upon completion of encoding and are removed gradually over time at the allocated fraction of the transmission channel bit rate allocated to the encoded video signal at that moment in time. However, as noted above, the decoder buffer removes pictures at different times for decoding. As a result, the times at which the encoder inserts a picture into the decoder buffer do not necessarily correspond to a fixed delay preceding the times at which the decoder removes such pictures from the decoder buffer. To prevent decoder buffer underflow and overflow given this lack of precise correlation, such encoders further constrain the allocation of bits to each picture to ensure that the encoder's model of the decoder's buffer fullness never exceeds some threshold $b_{hi}$ or falls below some threshold $b_{lo}$ where the high threshold $b_{hi}$ is somewhat below the maximum decoder buffer fullness $B_{max}$ and the low threshold $b_{lo}$ is somewhat above 0. Such headroom reduces the encoder's flexibility to use bits in pictures. Specifically, the encoder must use too many bits for low complexity pictures if the fullness of the encoder's model of the decoder's buffer is close to $b_{hi}$ (because a risk of a decoder buffer overflow is presumed) and too few bits for high complexity pictures if the fullness of the encoder's model of the decoder's buffer is too close to $b_{lo}$ (because a risk of a decoder buffer underflow is presumed).

It is an object of the present invention to overcome these disadvantages.

SUMMARY OF THE INVENTION

This and other objects are achieved according to the present invention. According to one embodiment, an encoding process and encoding apparatus are provided. According to the process, fields of a digital signal are processed to detect repeat fields. Adjacent pairs of the non-repeated fields are organized into frames. A determination is made whether to encode each of the frames as an intraframe, a predicted frame or a bidirectionally predicted frame. The frames are encoded in a specific, predefined order relative to the order of capture of the frames and the type of frame (intraframe, predicted frame, bidirectionally predicted frame, etc.) After each bidirectionally predicted frame that immediately precedes one of the detected repeat fields, encoding of a frame is delayed for one field time. Additionally, after encoding each reference frame that is the very next reference frame to be encoded after a second reference frame, which second reference frame immediately precedes one of the detected repeat fields, encoding of a frame is delayed for one field time.

According to this embodiment, encoding is paused for one field time at the same points in the encoded frame sequence that a decoder pauses the decoding of the encoded frame sequence.

The apparatus for encoding includes an inverse teleciner, a picture organizer and type selector, a compressor and a repeat field delay matcher. The inverse teleciner is for processing fields of the digital signal to detect repeat fields. The picture organizer and type selector is for organizing adjacent pairs of the non-repeated fields into frames. The picture organizer and type selector is also for determining whether to encode each of the frames as an intraframe, a predicted frame or a bidirectionally predicted frame. The compressor is for encoding the frames in a specific, predefined order relative to the order of capture of the frames and the type of frame as determined by the picture organizer and type selector. The repeat field delay matcher is for, after each bidirectionally predicted frame that immediately precedes one of the detected repeat fields, and each reference frame that is the very next reference frame to be encoded after a second reference frame that immediately precedes a repeat field, delaying encoding of a frame for one field time.

Illustratively, statistics may be gathered for multiple encoded video signals and used to allocate a bit rate for transmitting each encoded video signal. Such statistics gathering and bit rate allocation illustratively may be performed by a statistics computer.

According to another embodiment, a process and apparatus for statistically multiplexing multiple encoded digital video signals are provided. According to the process, statistics are gathered for one or more of the encoded digital video signals. Based on the gathered statistics, bit rates are allocated for transmitting one or more of the digital video signals as encoded. One of the digital video signals is encoded to produce a certain number of bits for each encoded picture in accordance with a decoder buffer model having a predefined size and filling at a certain bit rate. This "certain bit rate" is updated with the bit rate allocated to the one digital video signal. However, the update is delayed by a number of field display times depending on the number of times encoding pauses, and a presumed number of times decoding pauses, as a result of detected repeat fields in the video signal.

Illustratively, the bit rate update delay at the start of encoding a particular frame equals a constant plus the number of field times during which decoding is presumed to pause for each previously encoded frame minus the number of field times during which encoding pauses prior to the start of encoding the particular frame.

The apparatus for encoding includes a statistics computer, encoder and delay calculator. The statistics computer is for gathering statistics on one or more of the encoded digital video signals. Based on the gathered statistics, the statistics computer allocates bit rates for transmitting one or more of the digital video signals as encoded. The encoder is for encoding one of the digital video signals to produce a certain number of bits for each encoded picture in accordance with a decoder buffer model having a predefined size and filling at a certain bit rate. The delay calculator updates the "certain bit rate" with the bit rate allocated to the one digital video signal. The delay calculator delays this update by a certain number of field display times depending on the number of times encoding pauses, and a presumed number of times decoding pauses, as a result of detected repeat fields.

DETAILED DESCRIPTION OF THE INVENTION

This invention is illustrated herein in the context of encoding a video signal which contains repeat fields. Encoding is performed using a compression technique, such as MPEG-2, which discards each repeat field and sets a "repeat_first_field" flag in its place. The repeat_first_field flag causes a decoder to automatically repeat the appropriate field in the reconstructed video signal. Of course, this invention applies for other types of encoded signals where it is desired to cause encoding pauses to track decoding pauses to reduce fluctuations in encoding to decoding delay.

Figure 11:
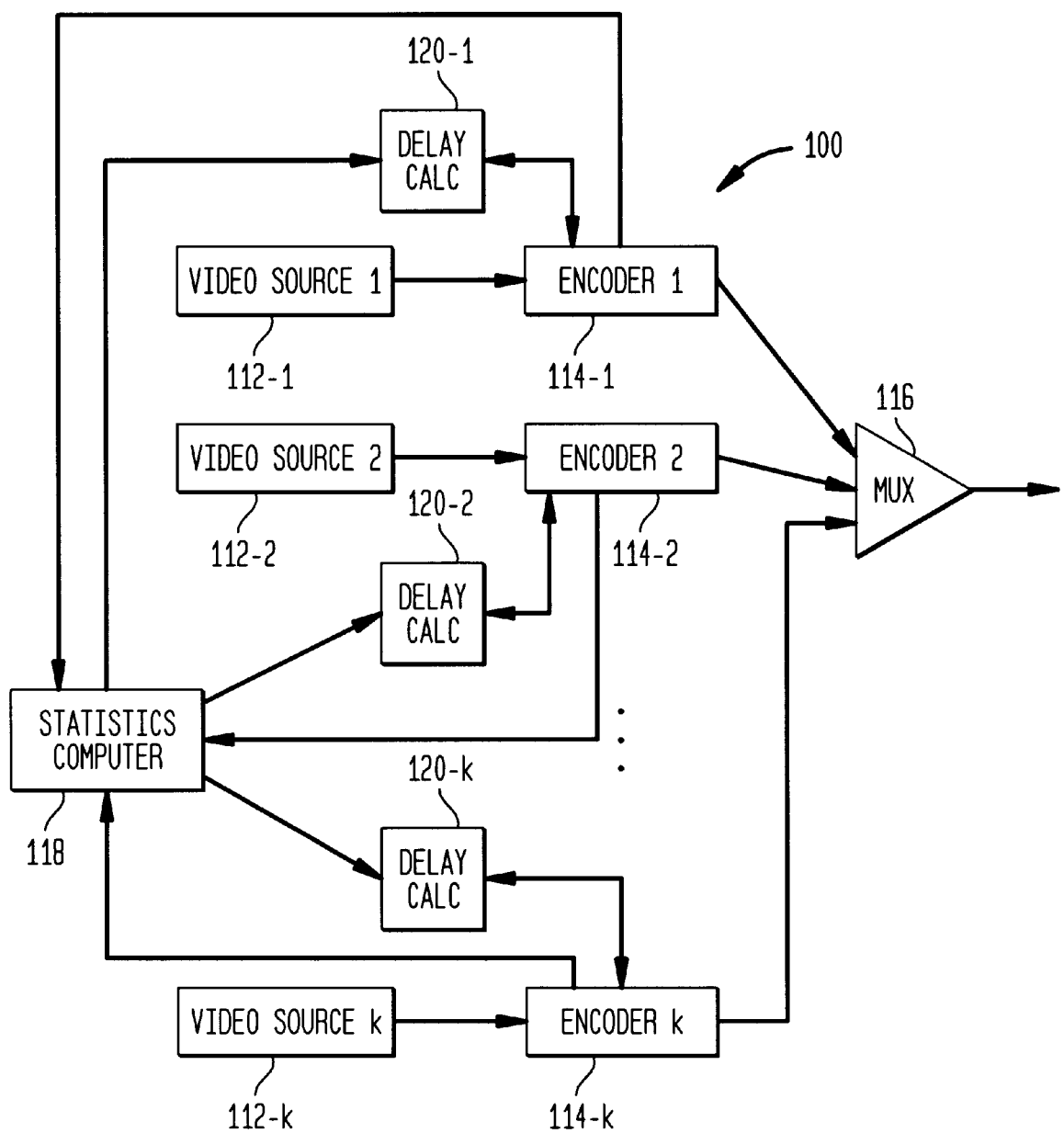
FIG 11 shows a statistical multiplexer according to an embodiment of the present invention.

FIG. 11 shows a statistical multiplexing system 100 according to an embodiment of the present invention. Illustratively, the statistical multiplexing system 100 combines multiple encoded digital video signals for output in a transmission channel. Each of k>1 video sources 112-1, 112-2, . . . , 112-k outputs a digital video signal. The video sources 112-1, 112-2, . . . , 112-k may be video tape players, video file servers including magnetic or optical disc drives, cameras, editors, special effects generators or the like. The digital video signals are received at a respective encoder 114-1, 114-2, . . . , 114-k. Illustratively, the encoders 114-1, 114-2, . . . , 114-k may be implemented using one or more DV Expert™ encoders. Furthermore, the digital video signals outputted from video sources 112-1, 112-2, . . . , 112-k preferably include, or are later combined with, digital audio signals and other data signals that, in conjunction with each respective digital video signal, constitute a complete video program. Such audio signals are also preferably encoded. (The encoding of audio signals is typically much simpler as the number of bits per audio frame does not vary for certain audio encoding standards, such as Dolby AC-3. Audio encoding is therefore not described herein.) Multiple DV Expert™ encoders can be connected together to operate in concert in encoding a high resolution video signal or to perform other signal processing in conjunction with encoding.

The encoded video signals outputted from each video encoder 114-1, 114-2, . . . , 114-k are received at the multiplexer 116 which multiplexes the received encoded video signals together. The multiplexer can be the System Remultiplexer™ distributed by Divicom, Inc.™, a company located in Milpitas Calif. Each encoder 114-1, 114-2, . . . , 114-k furthermore generates a priori and/or a posteriori statistics regarding the complexity of encoding pictures. The following is a non-exhaustive list of the types of statistics which may be generated: number of bits in a compressed picture, average quantization level, scene change locations, repeat field locations, picture types (i.e., I, B, P, field/frame, etc), and inter-pixel differences. Such statistics are dynamically generated by each encoder 114-1, 114-2, ..., 114-k and are periodically outputted to a statistics computer 118.

The statistics computer 118 gathers all of the statistics provided by each processor. Using the statistics provided by each processor, the statistics computer 118 periodically allocates, or reallocates, fractions of the transmission channel bit rate to each of the encoders 114-1, 114-2, ..., 114-k. Illustratively, the statistics computer 118 uses the information indicating the complexity of encoding each digital video signal to equalize the quality of each video signal. In other words, the statistics computer allocates a fraction of the transmission channel bit rate to encoding a video signal which is proportional to the complexity of encoding that particular video signal relative to the complexity of encoding each other video signal, at that moment in time. The statistics computer 118 may be implemented with any suitably programmed processor.

Also shown are multiple delay calculators 120-1, 120-2, ..., 120-k, namely, one delay calculator 120-1, 120-2, ..., 120-k for each encoder 114-1, 114-2, ..., 114-k. Illustratively, each delay calculator 120-1 to 120-k is implemented as either part of each encoder 114-1 to 114-k or part of the statistics computer 118. Preferably, the delay calculators 120-1 to 120-k are implemented using processors in the encoders 114-1 to 114-k or the statistics computer 118. The delay calculators 120-1 to 120-k receive indications of when repeat fields are detected by the inverse teleciner of each encoder 114-1 to 114-k. The delay calculators 120-1 to 120-k also receive information from the statistics computer 118. Illustratively, communication of bit rates allocated to each encoder 114-1 to 114-k by the statistics computer 118 may be delayed by the delay calculators 120-1 to 120-k depending on the detection of repeat fields.

Figure 5:
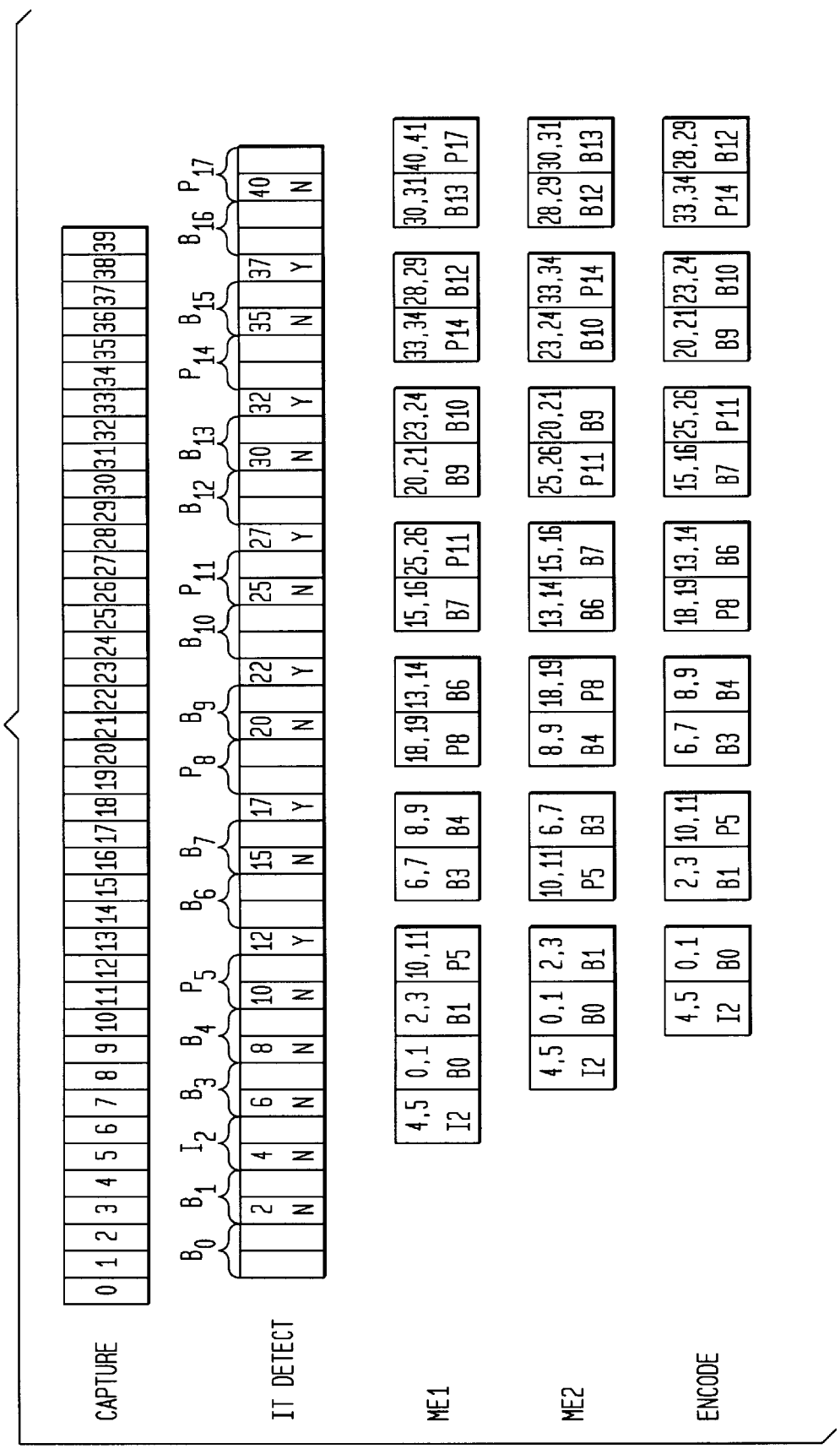
Figure 6:
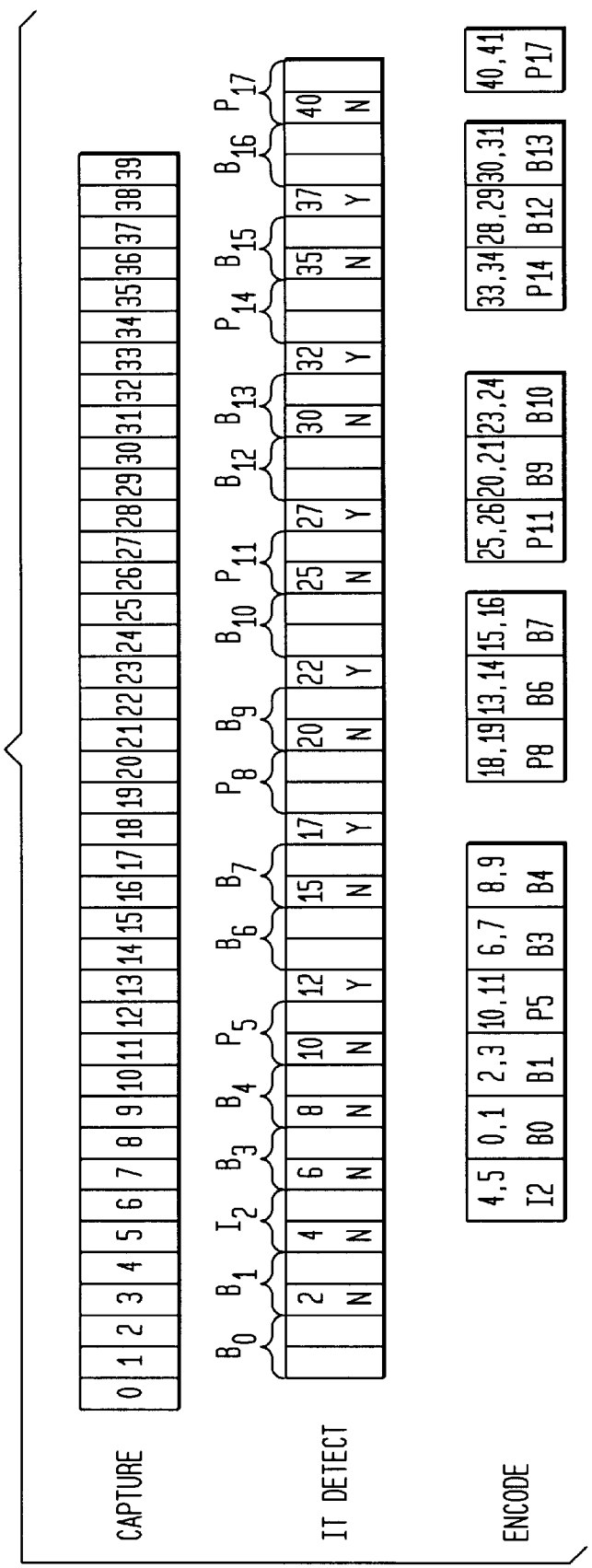
Figure 7:
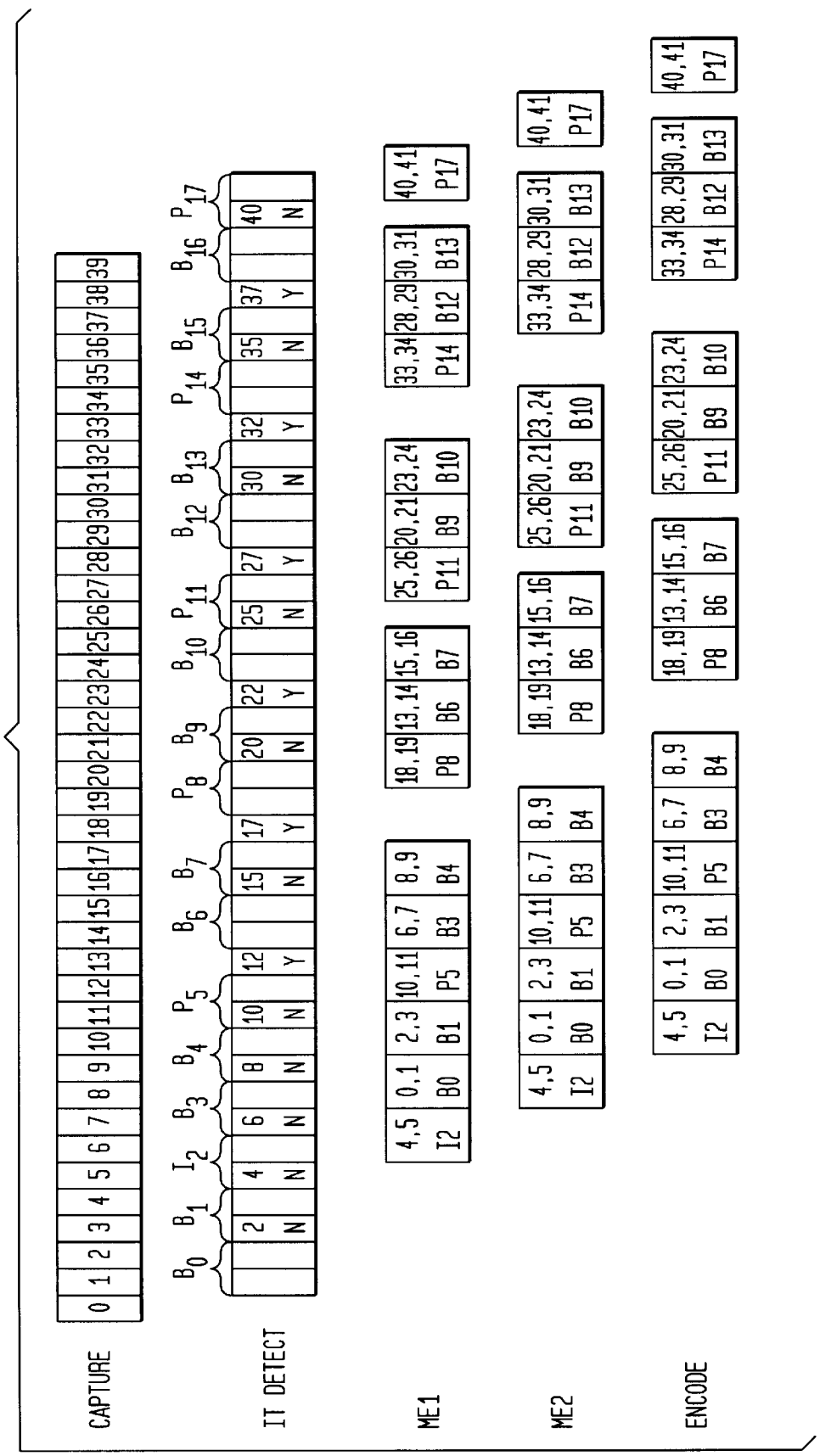
Figure 8:
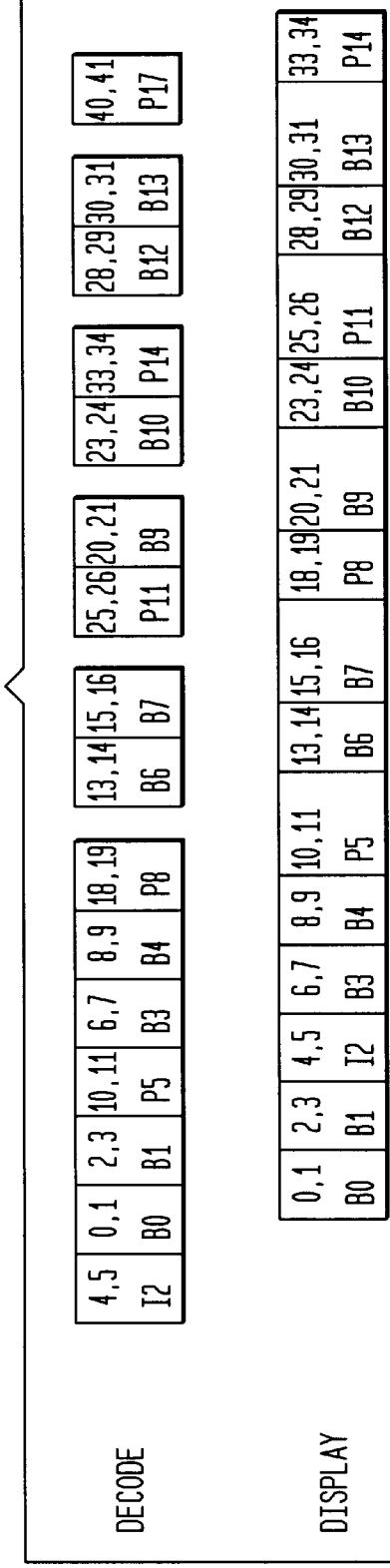
FIG. 8 is a timing diagram showing decoding and presentation timing of a conventional decoder.
Figure 9:
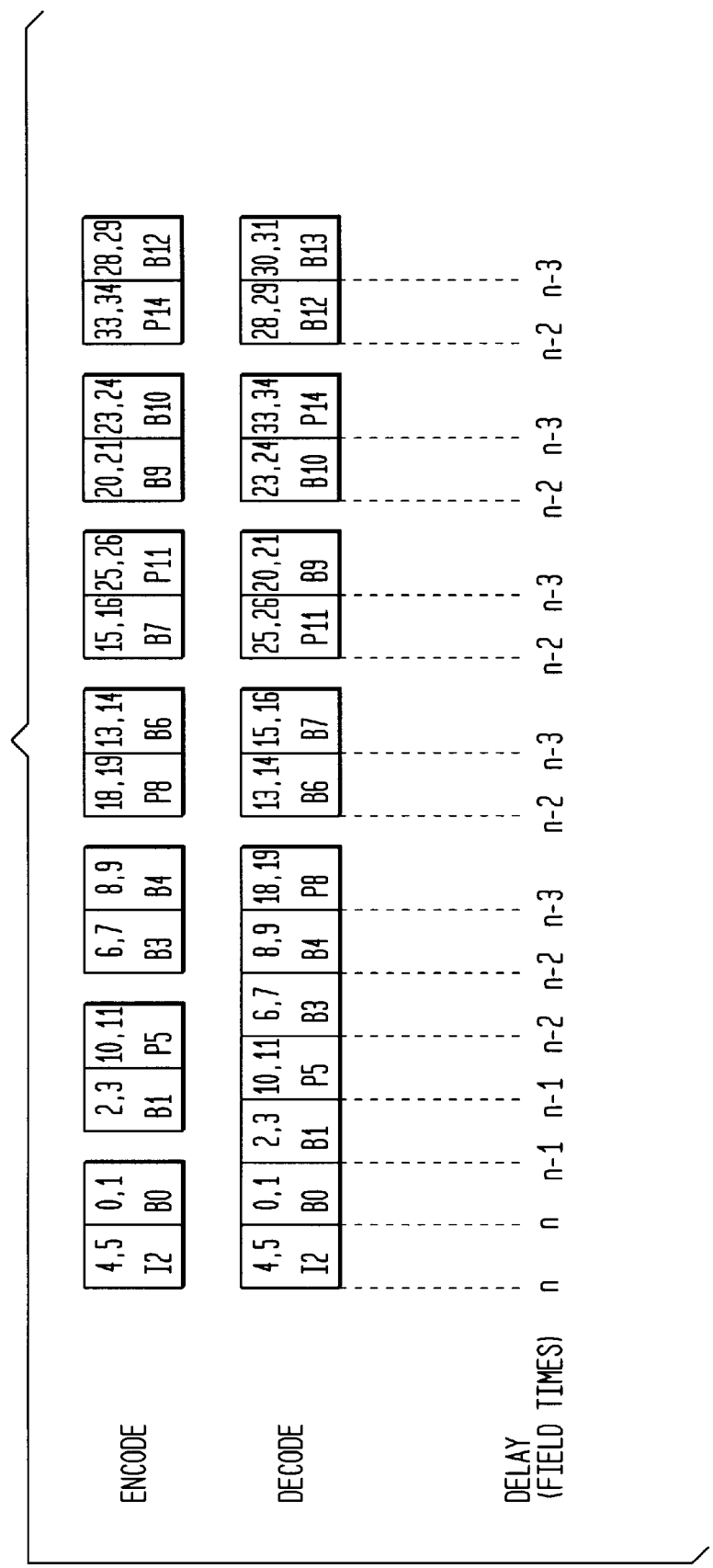
FIGS. 9 and 10 are timing diagrams showing encoding to decoding delay fluctuations for the encoders of FIGS. 5–7 and the decoder of FIG. 8.
Figure 10:
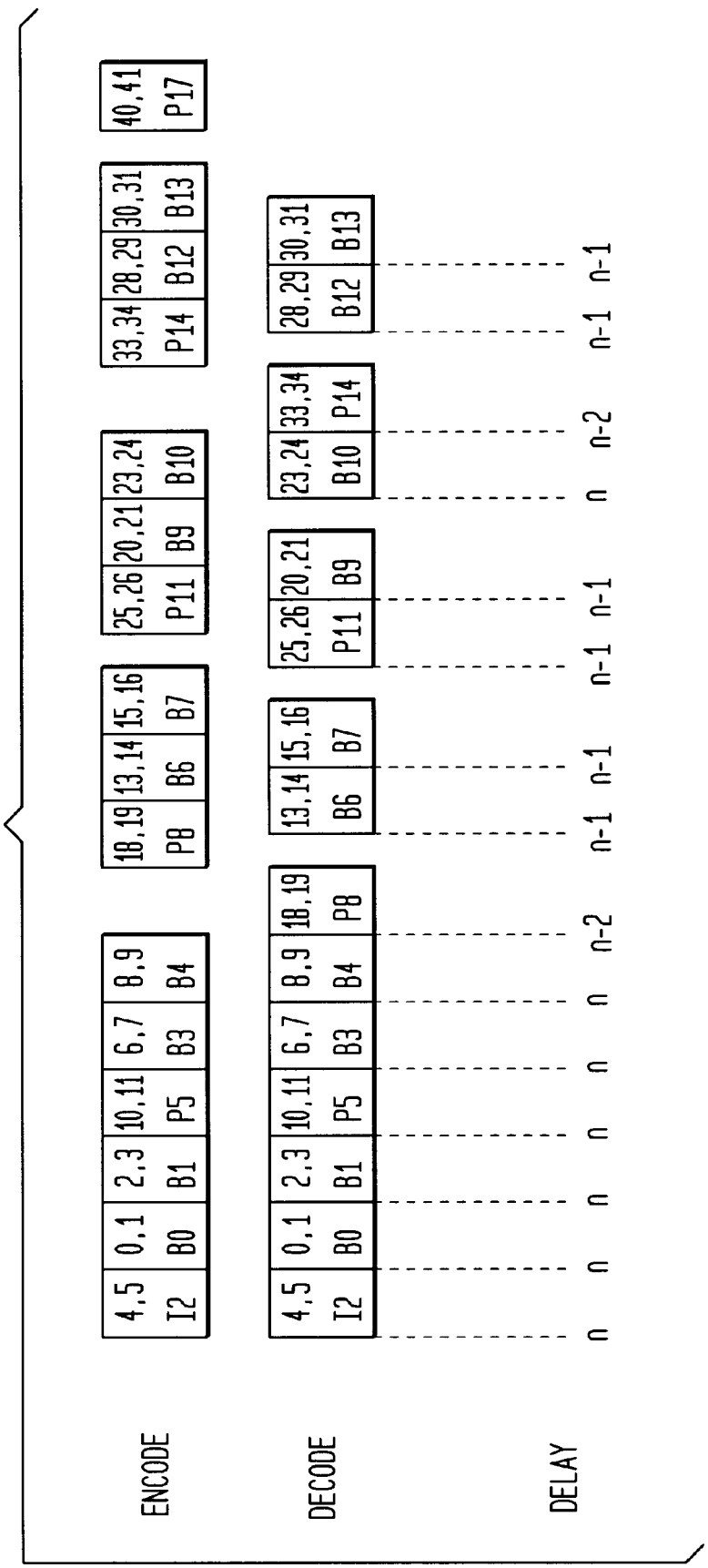
Figure 12:
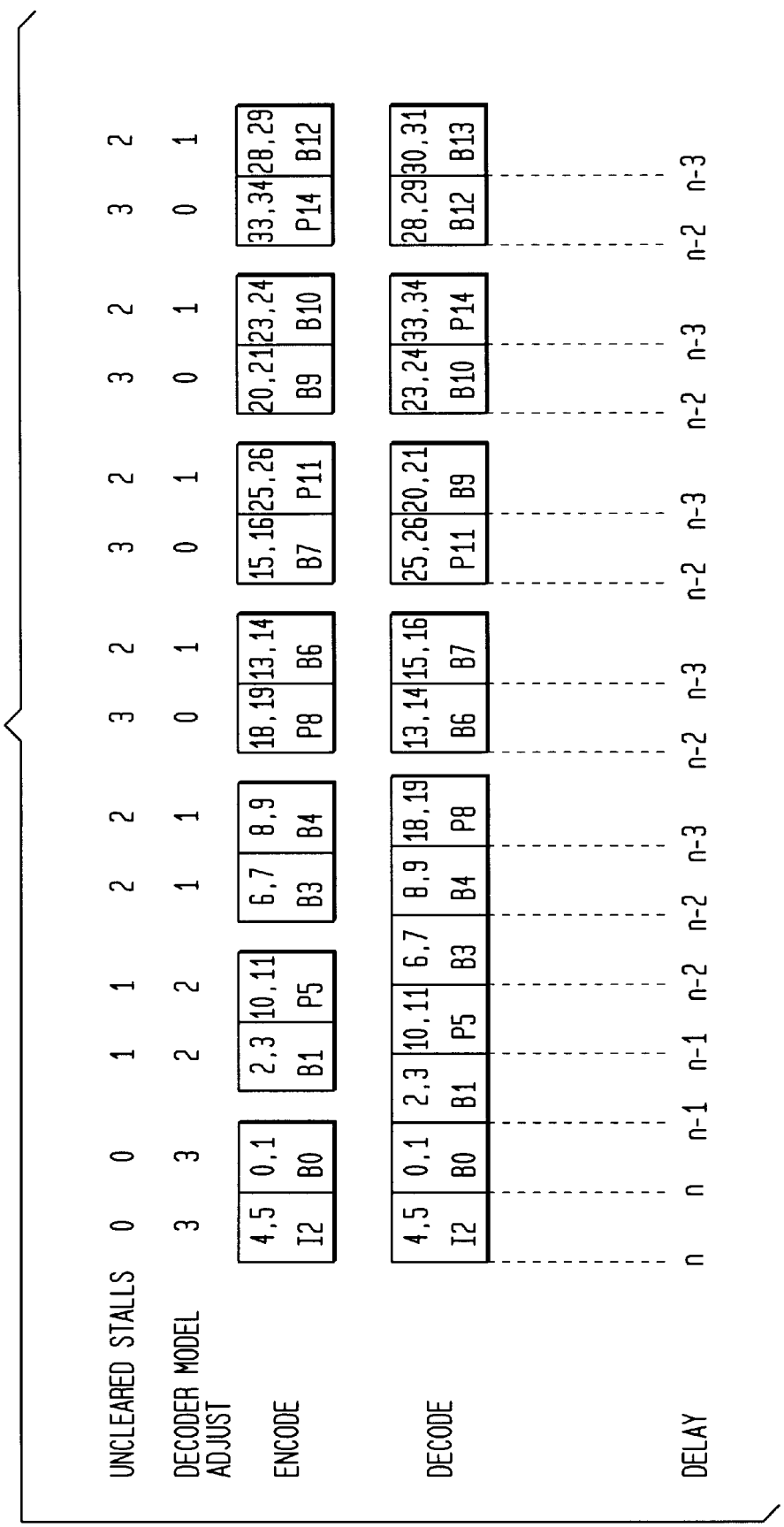
FIG. 12 is a timing diagram showing the calculation of delays by the delay calculators of FIG. 11.

The calculation by the delay calculators 120-1 to 120-k is now described. Each delay calculator determines (1) the maximum number of "uncleared stalls", (2) the actual number of "uncleared stalls" and the difference between these two values. Here an "uncleared stall" is a count of the number of fields times for which the encoder has paused encoding previously to this point in the sequence of encoded frames minus the presumed number of field times the decoder will pause while decoding each frame previously encoded to this point in the sequence of encoded frames. For example, consider the timing chart of FIG. 12 which illustrates the calculation of actual uncleared stalls for the immediate stall/three frame pipeline encoder using the aforementioned previously considered repeat field pattern shown in FIG. 5. As shown, the number of actual uncleared stalls during encoding of frames I2 and B0 is 0 because neither encoding nor decoding pauses for these frames. After frame B0, encoding pauses for one field time, but decoding does not pause at this frame. Thus, the number of uncleared stalls at the start of encoding each of frames B2 and P5 increases to 1. Next, after frame P5, encoding pauses again for one field time, but decoding does not pause after frame P5. This is a second uncleared stall, so the actual number of uncleared stalls increases to 2 at the start of encoding each of frames B3 and B4. Likewise, the actual number of uncleared stalls increases to 3 at the start of encoding frame P8. The decoder then pauses decoding after frame P8. This constitutes clearance of one of the stalls and thus decreases the actual number of uncleared stalls to 2 at the start of encoding frame B6, etc.

In the immediate stall encoders, the maximum delay variation equals the maximum number of uncleared stalls. As noted above, the maximum delay variation is, in general, M+S−1 fields for an immediate stall decoder but only [(M+S−1)/2] fields if the encoder will not detect repeat fields in any two consecutive frames, where M is the picture spacing between reference frames and S is the number stages in the pipeline. In the case of a delayed stall encoder, the maximum delay variation is M fields but only [M/2] fields if the encoder will not detect repeat fields in any two consecutive frames. Assuming that the immediate stall encoder used is the type which does not detect repeat fields in any two consecutive frames, and using the appropriate formula [(M+S−1)/2] fields for FIG. 12, the maximum number of uncleared stalls is 3. The decoder model adjustment delay is thus 3 field times while encoding frame I2 and B0, 2 field times while encoding frames, B1 and P5, 1 field time while encoding the frames B3, B4, B6, P11, B10 and B12 and 0 field times while encoding the frames P8, B7, B9 and P14. The decoder model adjustment delay indicates the number of field times that an allocated bit rate is delayed (from the time it issues) until the time the encoder uses the bit rate to update the decoder buffer model (that is, update the bit rate at which the decoder buffer fills with encoded video signal data). For example, the encoder delays updating its decoder buffer model with a new bit rate for 3 field times, if the new bit rate is received at the encoder while the encoder encodes frame B0, but delays updating its decoder buffer model with a new received bit rate by only 0 fields times if the new bit rate is received while encoding frame P8.

In the preferred embodiment, the delay between the allocation of the new bit rates by the statistics computer 118 and the update of the decoder buffer models with the bit rates by the respective encoders 114-1 to 114-k exactly equals the above-noted "decoder model adjust field times". However, in the general case, additional delays may be added, e.g., the transmission time for transferring the rates from the statistics computer 118 to the encoders 114-1 to 114-k, or a delay needed to synchronize a received bit rate to the field or frame boundaries of the video signal encoded by the respective encoder 114-1 to 114-k.

By calculating the delay between allocating a bit rate and updating the decoder buffer model, it is possible to more precisely prevent decoder buffer overflows and underflows. Specifically, the allocation of bits to each picture is a function of the encoding to decoding delay, and the bit rate at which bits of each encoded picture are transferred. Conventional encoders assume that the encoding to decoding delay is constant. However, because of the different points in the sequence of encoded frames at which encoding and decoding pause in response to repeat fields, the delay between encoding and decoding of each picture tends to vary. Conventional encoders do not keep precise track of such variation and instead arbitrarily delay updating the decoder buffer model with the newly allocated bit rate, if the newly allocated bit rate is an increase over the previously allocated bit rate. The result is that null data is inserted to maintain the bit rate of the encoded video signal at times when such a delay is not needed. On the other hand, according to the present invention, the updating of the decoder buffer model with the newly allocated bit rate is delayed in exact correspondence to the variation in the encoding to decoding delay in effect at that moment. As such, the need to insert null data due to the variation in encode to decode delay is eliminated.

Operationally, the delaying of the update to the decoder buffer models using the allocated bit rates differs from the conventional delaying of rates. Specifically, according to the invention, the delays in updating the decoder buffer model depend on the times that the encoder has paused encoding due to detected repeat fields, the picture types and a presumed pause in decoding by the decoder in response to repeat_field_flags set for such detected repeat fields. On the other hand, conventional decoder buffer model update delays do not depend in any way on encoding pauses, picture types encoded in the encoded video signal or repeat_first_ field flags. Rather, conventional encoder delays depend solely on whether or not the newly allocated rate is a rate increase (in which case, the update of the decoder buffer model by the newly allocated bit rate is delayed) or a decrease (in which case no delay is imposed on updating the decoder buffer model). The advantage of the delaying technique according to the invention is that the encoder is allowed to maintain an accurate model of the decoder buffer fullness, whereas conventional techniques only allow the encoder to ensure that the fullness of its model of the decoder buffer is always less than or equal to the actual fullness of the actual decoder buffer. As can be appreciated, whenever the fullness of the conventional encoder's model of the decoder buffer is less than the actual fullness of the actual decoder buffer, the number of bits by which the actual fullness exceeds the fullness of the modeled decoder buffer are wasted.

Figure 1:
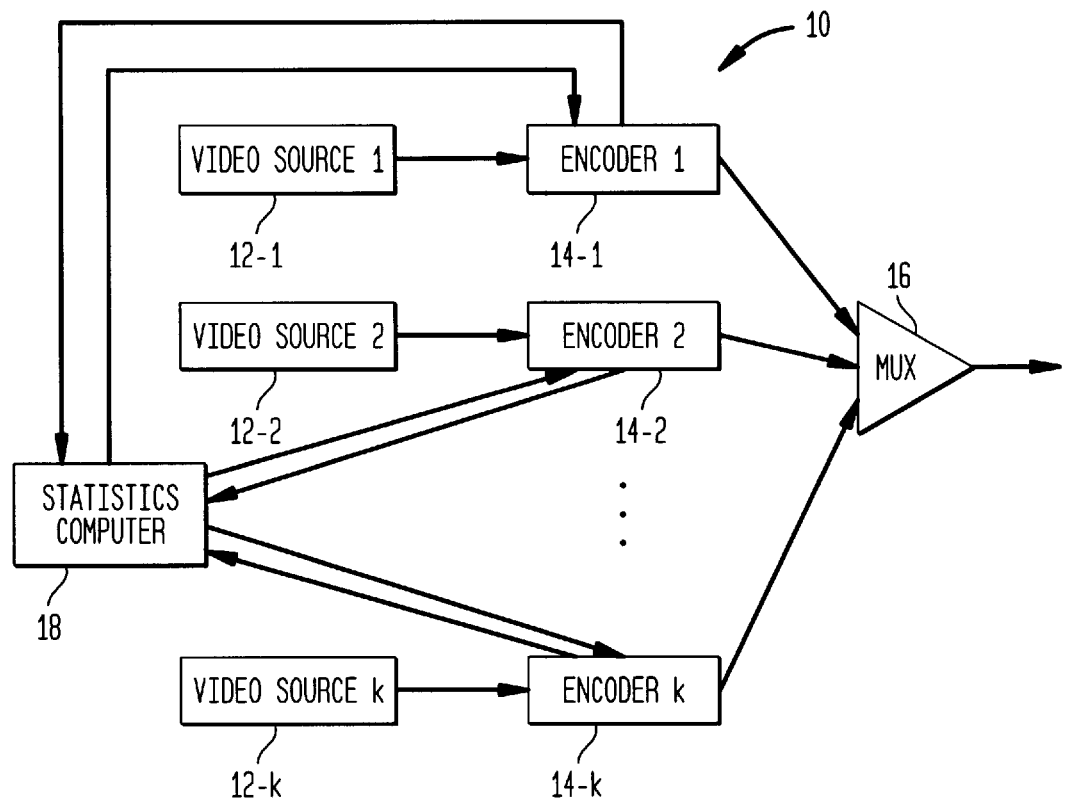
FIG. 1 shows a conventional statistical multiplexer.
Figure 3:
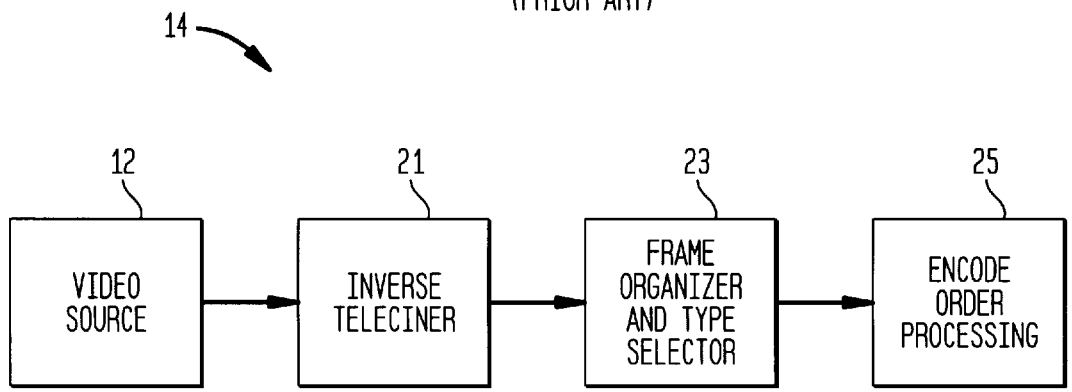
FIG. 3 shows a conventional encoder.
Figure 2:
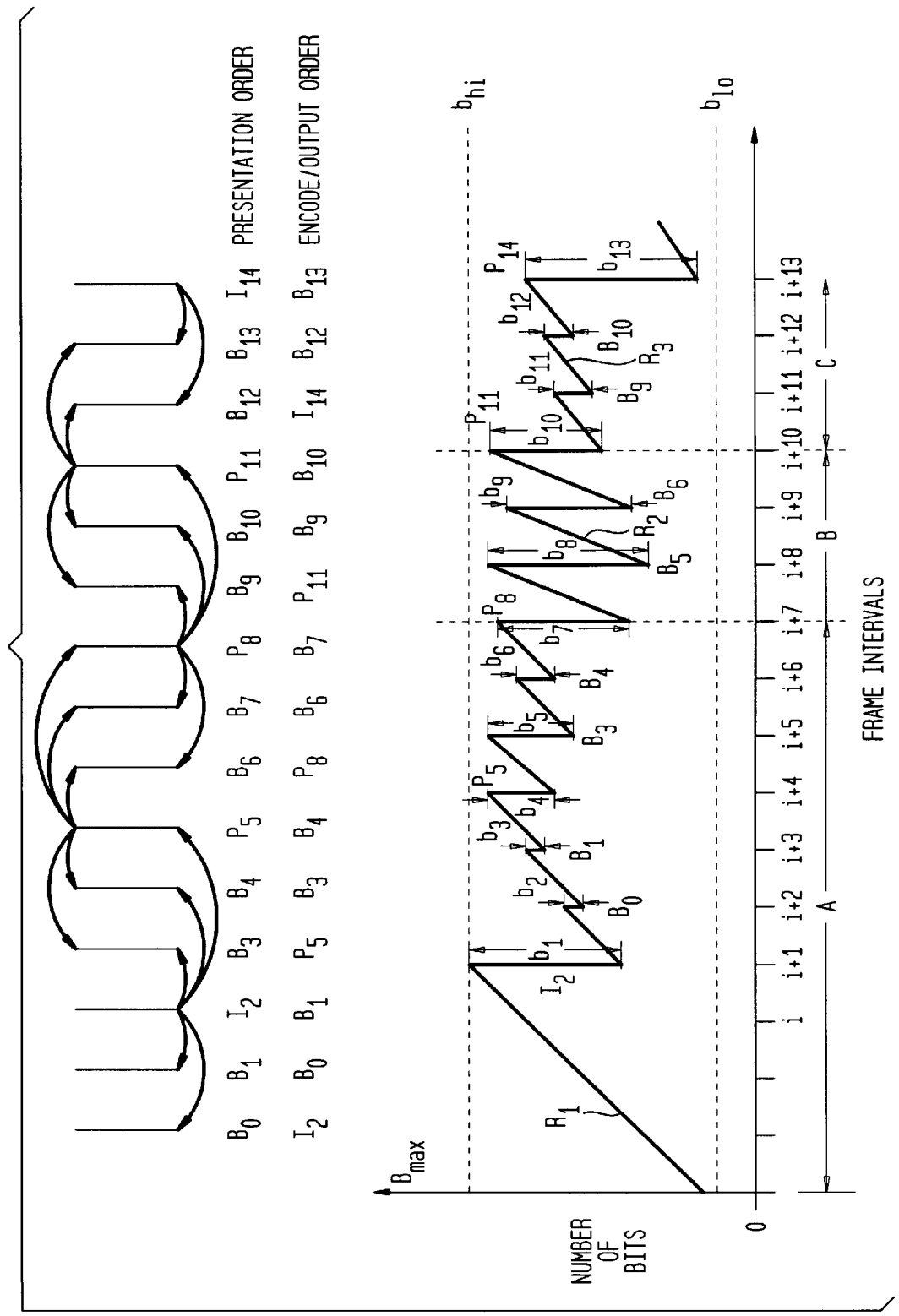
FIG. 2 shows a conventional decoder buffer model timing diagram.
Figure 4:
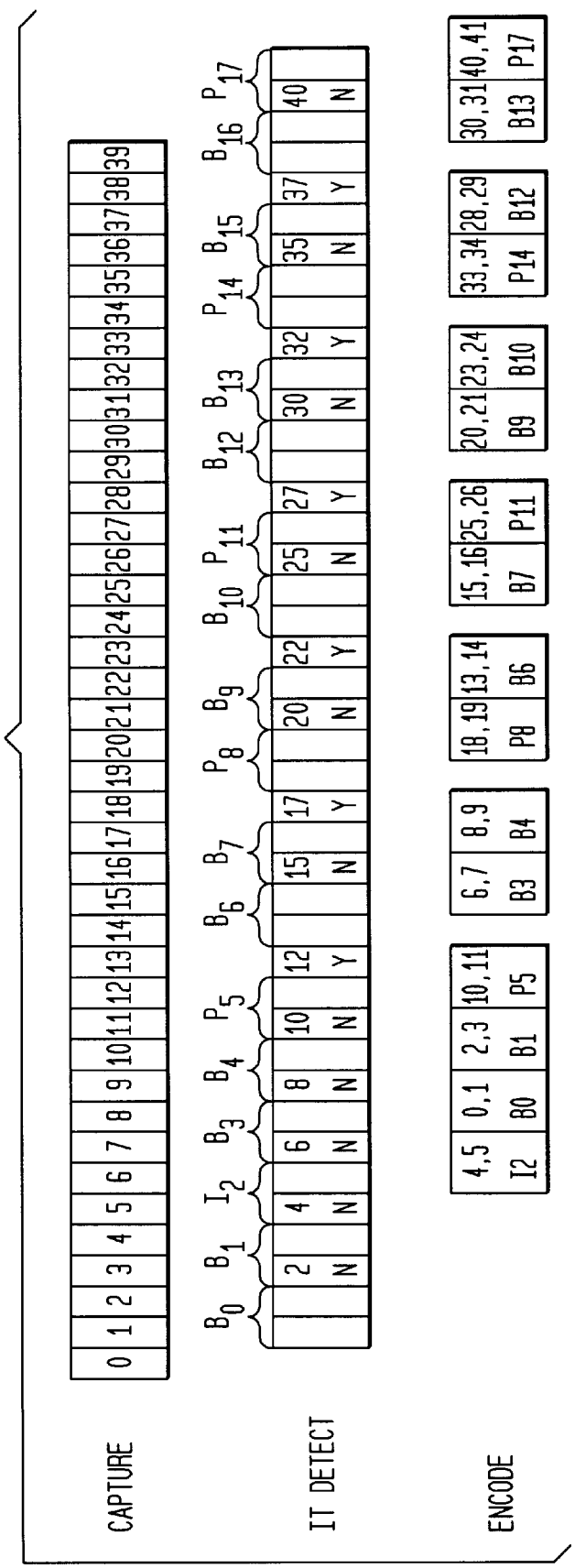
FIGS. 4–7 are timing diagrams showing capture, inverse telecine processing and encoding timing for conventional encoders.
Figure 13:
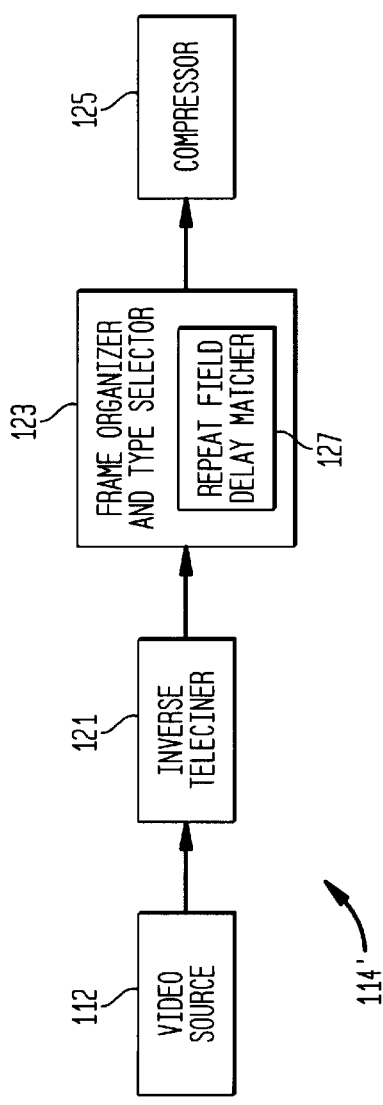
FIG. 13 shows an encoder according to a second embodiment of the present invention.

Referring to FIG. 13, an encoder 114' according to another embodiment is illustrated. Such an encoder 114' may be substituted for one of the encoders 14-1 to 14-k of FIG. 1. Furthermore, one or more encoders 114' and one or more encoders 114-1 to 114-k, and their corresponding delay calculators 120-1 to 120-k, can be connected together in the same statistical multiplexing system. Like the encoder 14 of FIG. 3, the encoder 114' has an inverse teleciner 121 and a compressor 125. The frame (picture) organizer and type selector 123 is modified to include a repeat field delay matcher 127. As with the counterpart devices of FIG. 3, each of the inverse teleciner 121, frame organizer and type selector 123, compressor 125 and repeat field delay matcher 127 can be implemented through appropriate programming of a processor such as the DV Expert™ encoder.

As before, the inverse teleciner 121 processes the video signal produced by a video source 112 in order to detect repeat fields. The frame organizer and type selector 123 discards the repeat fields and organizes the remaining adjacent fields into frames. The frame organizer and type selector 123 also selects the picture type of each frame, i.e., determines whether to encode the frame as an I frame, a P frame or a B frame. The repeat field delay matcher 127 determines when to pause encoding so that encoding pauses at precisely the same pictures and for the same number of field times as decoding. This is described in greater detail below. The compressor 125 encodes each frame and pauses encoding frames at the times determined by the repeat field delay matcher 127.

As noted above, the repeat field delay matcher 127 determines the precise frames of the encoded sequence of frames at which the decoder pauses and causes the compressor 125 to pause encoding at the same frames and for the same durations. A decoder pauses decoding in the following instances:

(1) if a B frame precedes a repeat field (the repeat field is part of that B frame), decoding pauses immediately for one field time after decoding that B frame, and (2) if a reference frame (I or P frame) precedes a repeat field (the repeat field is part of that reference frame) then decoding pauses for one field time after decoding the very next subsequent reference frame.

Figure 14:
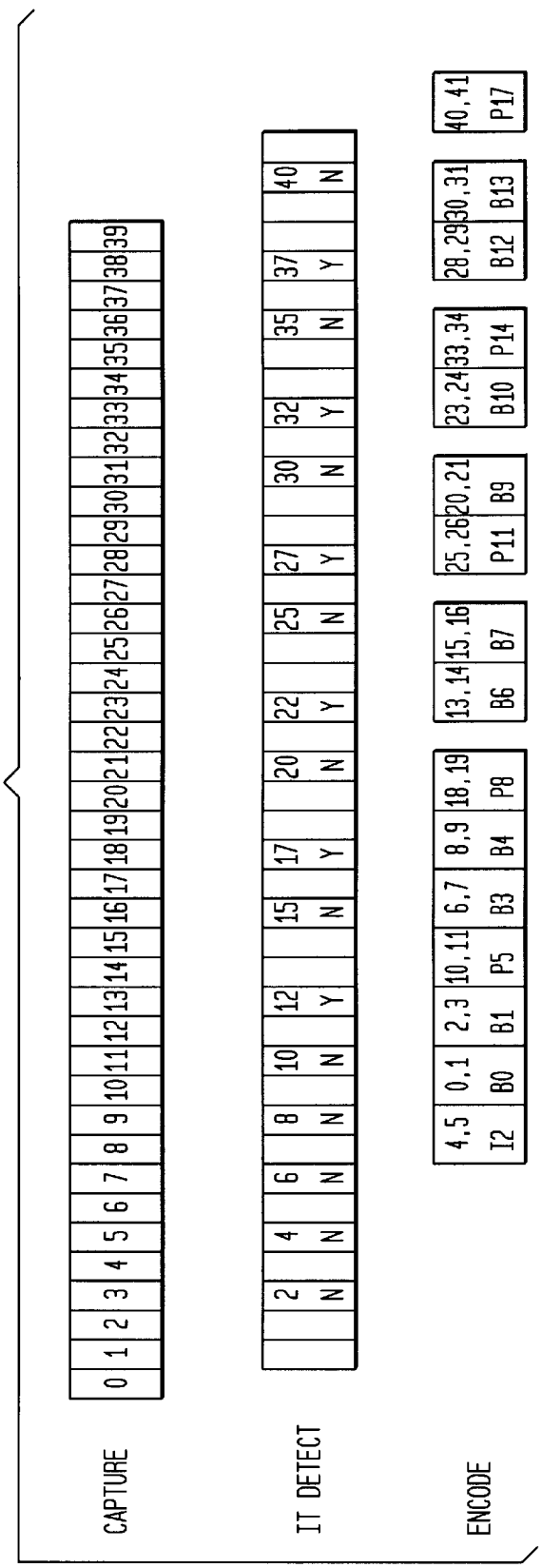
FIGS. 14 and 15 are timing diagrams showing encoding timing of the encoder of FIG. 13.

As illustrated in FIG. 14, which shows the timing relationship between capture, inverse telecine processing and encoding for a single frame pipeline encoder, the repeat field delay matcher 127 achieves this same delay behavior for encoding. The repeat field pattern used in FIG. 14 is the same pattern as was used in the description above in connection with FIGS. 4–10 and 12. First, the repeat field delay matcher 127 allows M+m fields to be captured and to complete inverse telecine processing before sending any frame data to the compressor 125, where M is the interframe spacing between reference frames and m is the maximum number of repeat fields that can be detected in a sequence of M frames. In this case M=3 and m is assumed to be 2. This assumption presumes that the inverse teleciner 121 operates in a manner such that repeat fields are never detected in any two consecutive frames. If the inverse teleciner 121 can detect repeat fields in consecutive frames, then m would equal 3. (Note that the compressor 125 also uses one frame time to encode each frame and thus the first encoded frame is encoded when fields 7 and 8 are being inverse telecine processed.) The first repeat field is detected at field 12. This field 12 is a repetition of field 10 which is part of the reference frame P5. Thus, the repeat field delay matcher 127 causes encoding to pause for one field time immediately following the very next to-be-encoded reference frame, namely, frame P8. As noted above, this is precisely the same point in the encoded frame sequence that the decoder pauses while presenting field 10 during field time 12. A similar encoding pause is achieved after encoding frame P14, which follows a previous reference frame P11 that precedes a repeat field detected at field time 27. The next repeat field is detected at field 17. Field 17 is a repetition of field 15 which is part of frame B7. As such, the repeat field delay matcher 127 causes encoding to pause for one field time immediately after encoding frame B7. Again, this is precisely the same point in the encoded frame sequence at which decoding pauses while presenting field 15 during field time 17. Similar encoding pauses are achieved after encoding each of frames B9 and B13 which both have repeat fields.

Figure 15:
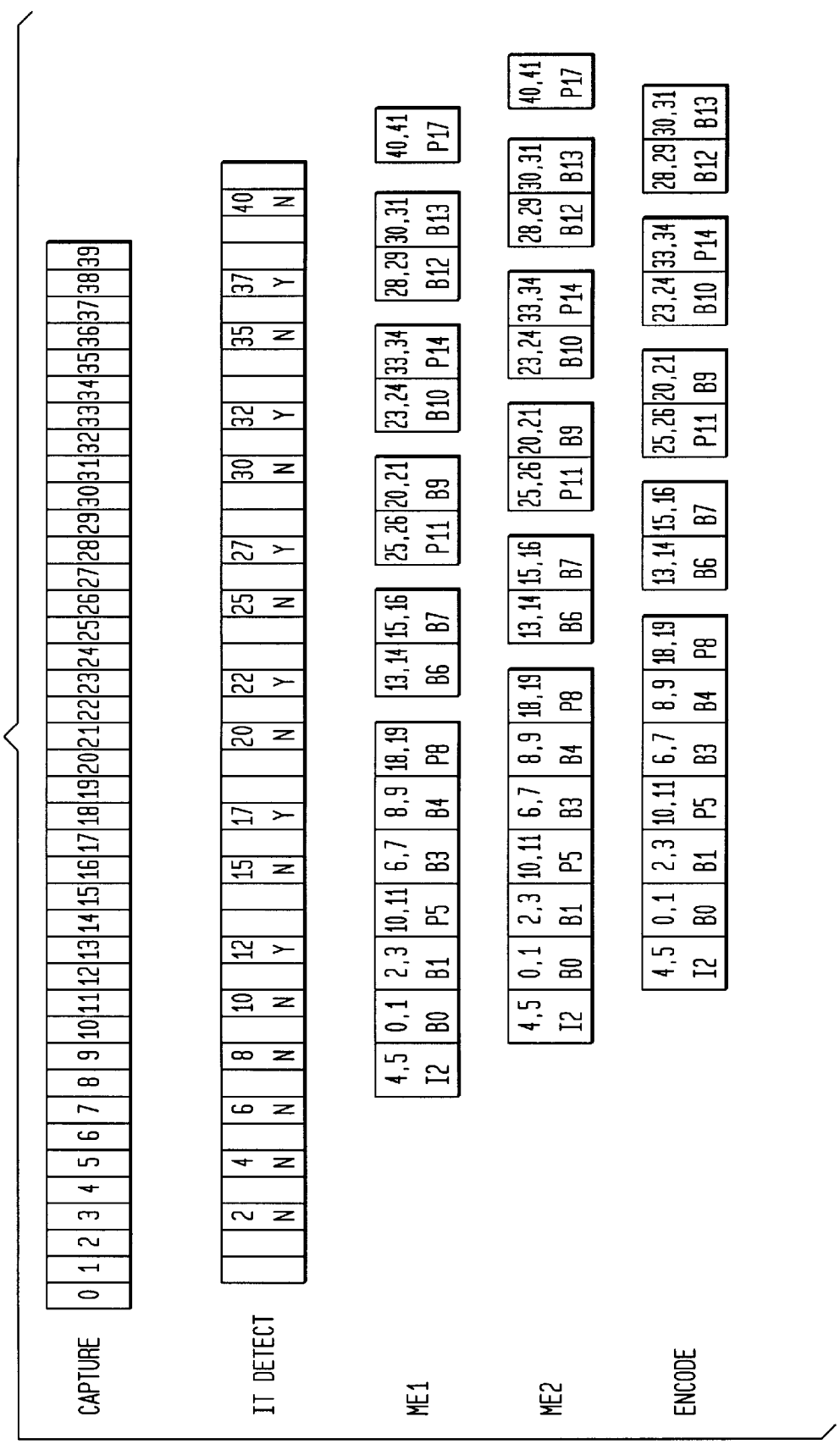

FIG. 15 shows a similar timing relationship when a repeat filed delay matcher 127 is employed in a three stage pipeline encoder. Again, the same repeat field sequence is used to illustrate the invention and the same assumptions regarding inter-reference frame spacing (M=3) and maximum number of repeat fields (m=2) are made. Since the repeat filed delay matcher 127 regulates the flow of encoded pictures, each stage of the three stage pipeline encoder need only process frames when available from the previous stage. As noted, encoding pauses in the final stage match the encoding pauses in the single stage pipeline encoder illustrated in FIG. 14 and the decoder timing pauses in FIG. 8. Note that the encoded frames begin to be outputted when inverse telecine processing of field 11 begins. In the embodiment in FIG. 15, all stages (ME1, ME2 and encode) pause processing in between the same frames that a decoder is presumed to pause decoding.

Figure 16:
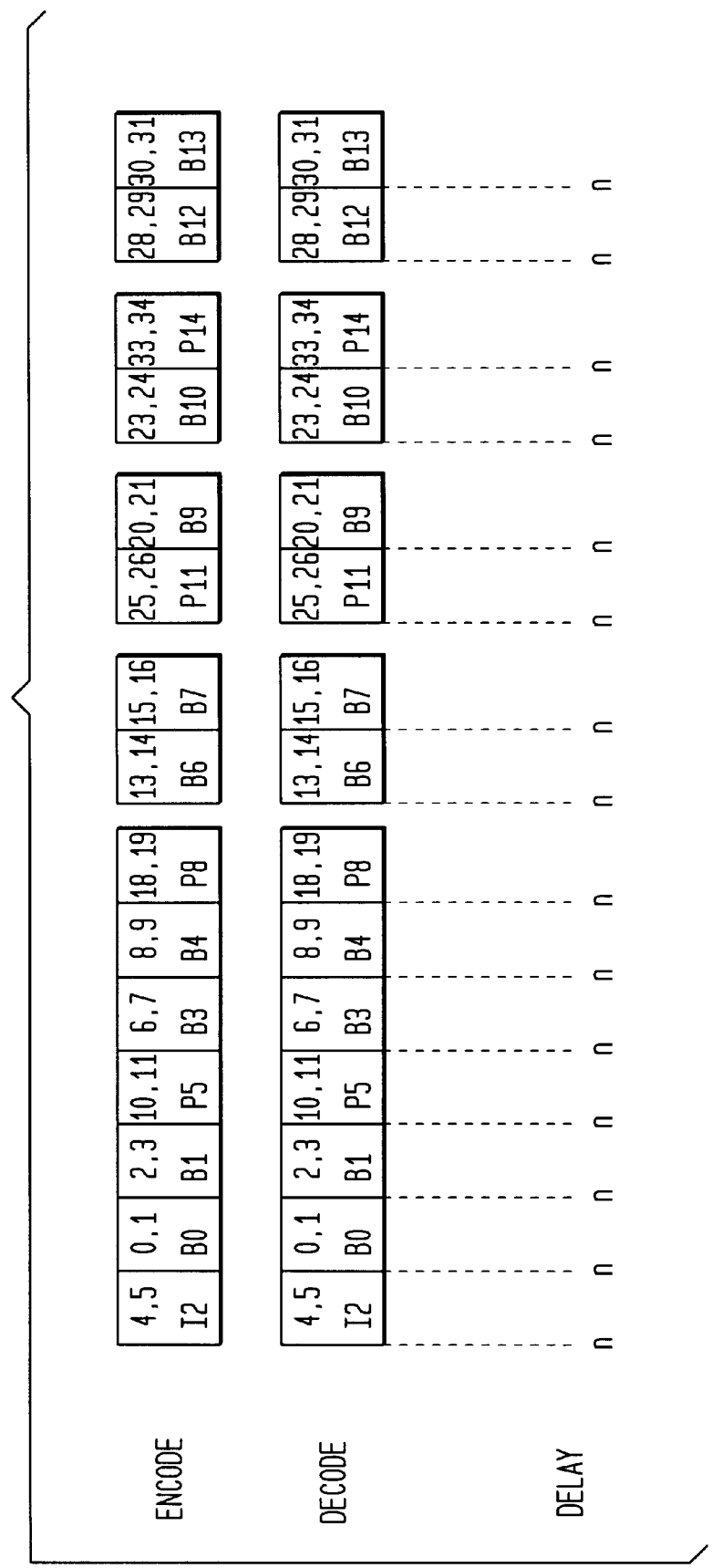
FIG. 16 is a timing diagram showing encoding to decoding delay for the encoder of FIG. 13.

FIG. 16 illustrates the encode and decode timing and the amount of delay for each frame between encoding and decoding. As can be seen the delay does not fluctuate but rather is always constant at n field times.

By causing encoding to pause at the same points in the sequence of encoded pictures that decoding is presumed to pause, the encoding to decoding delay is made constant in regard to repeat fields. As such, any newly allocated bit rate can be implemented immediately. Moreover, because encoding to decoding delay fluctuations as introduced by repeat fields are suppressed, the decoder buffer model in the encoder more accurately tracks the actual behavior (i.e., fullness) of the decoder buffer. This allows the encoder to relax or even eliminate the thresholds $b_{lo}$ and $b_{hi}$ in the decoder model. By relaxing or eliminating such thresholds, the encoder can allow its model of the decoder buffer fullness to more closely approach the maximum storage capacity of the decoder buffer, immediately before removing a picture, or to more closely approach the zero fullness, when a picture is removed. Such increases in the swing of the encoder model of the decoder buffer fullness allow the encoder more freedom in allocating bits from picture to picture. As such, the quality of the pictures, when decoded and reconstructed from the encoded video signal, is increased.

Figure 17:
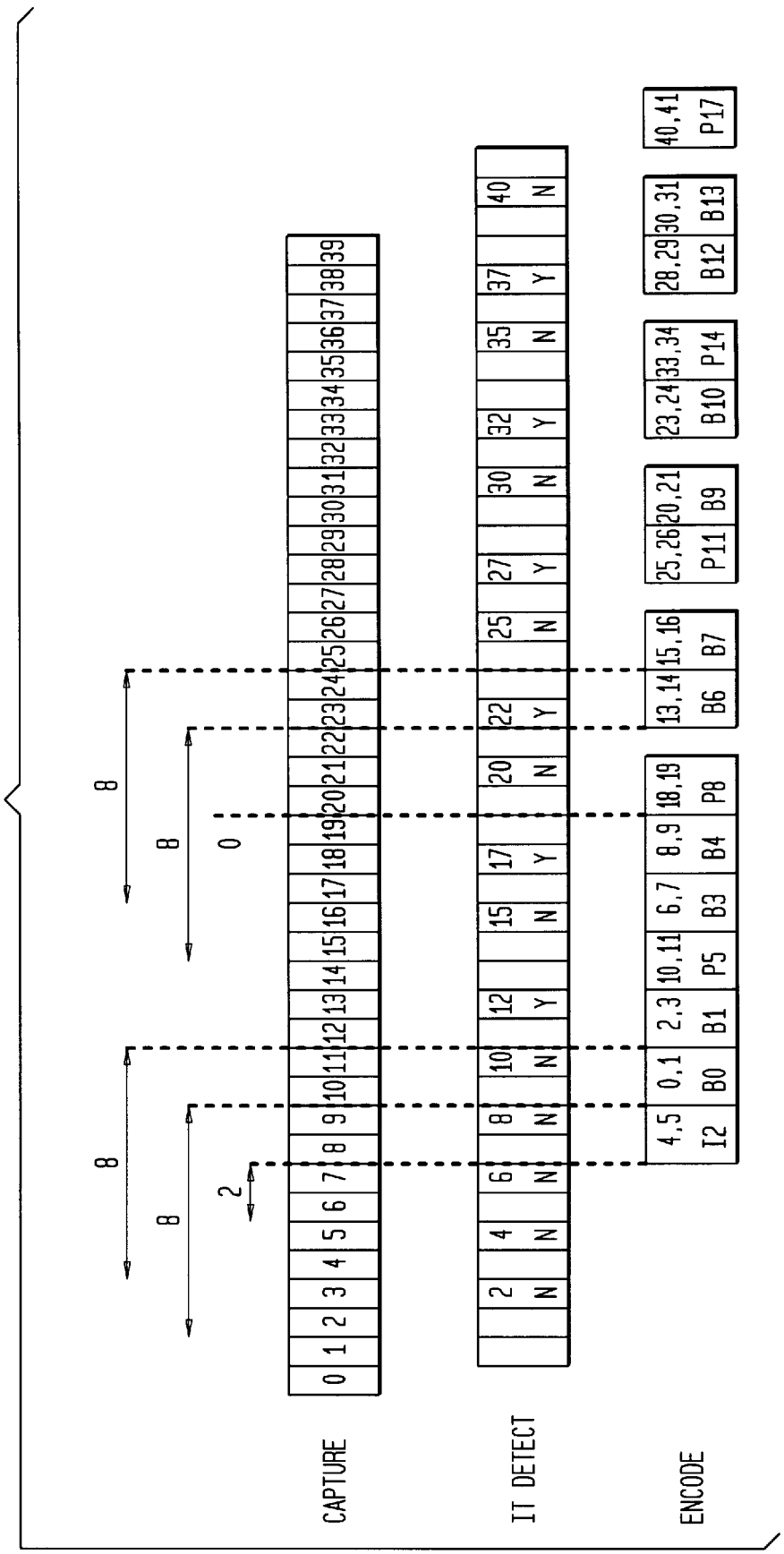
FIG. 17 is a timing diagram showing capture to encoding delay in the encoder of FIG. 13.
Figure 18:
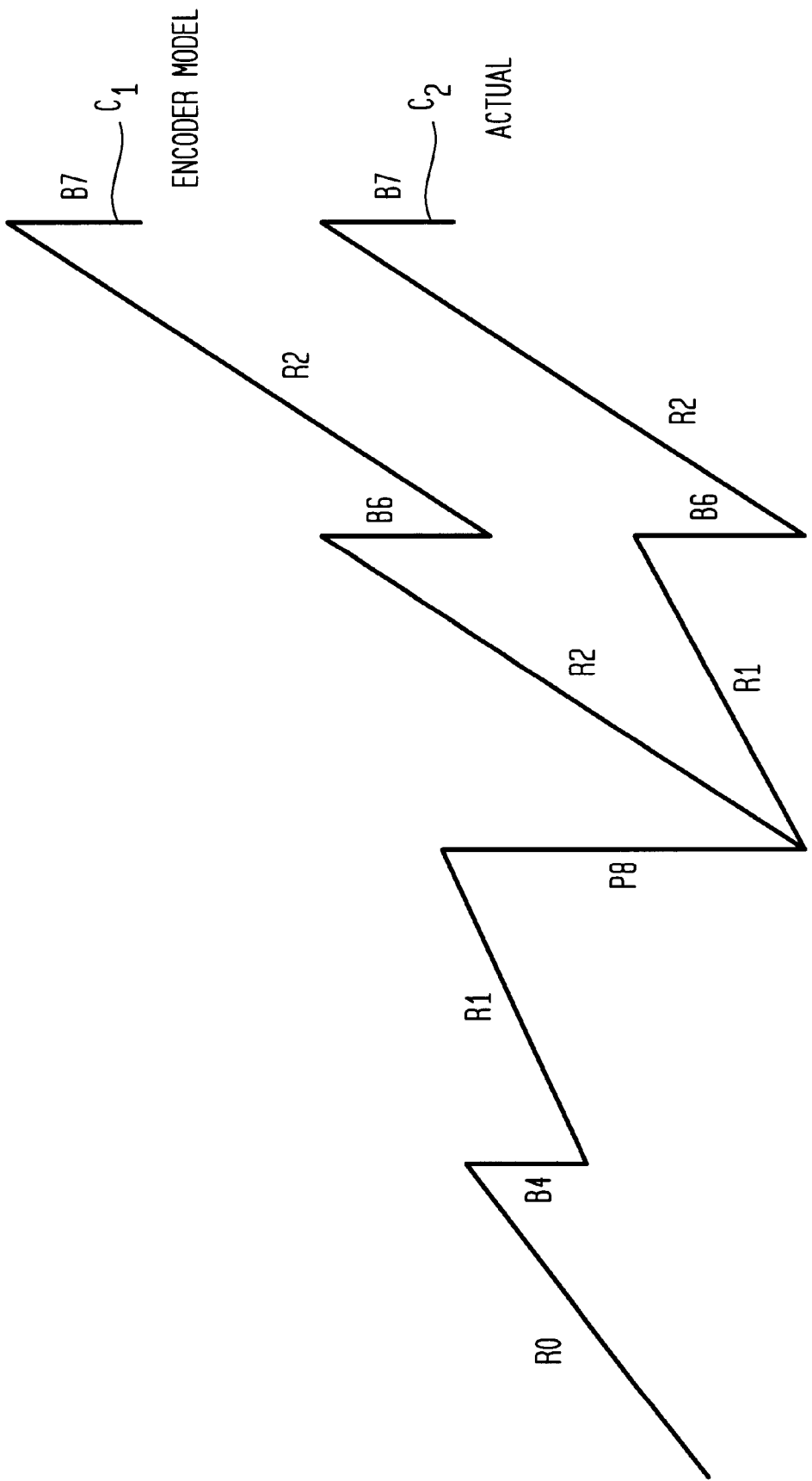
FIG. 18 is a timing diagram showing a divergence in the fullness of an encoder's model decoder buffer and the actual fullness in an actual decoder buffer that decodes the encoded video signal produced by the encoder.

A rule can be devised for delaying the input of frames to the compressor 125 by the frame organizer and type selector 123 and repeat field delay matcher 127 when a single frame encoding pipeline is used. A B frame is delayed 2M+m fields between the time that capture of the B frame begins and the time that encoding of the B frame begins. For example, FIG. 17 shows the delay between capture of frames and encoding of frames for the single frame pipeline encoder using the above noted sequence of pictures. In such a sequence of pictures, the inter-reference frame spacing M is equal to 3 and the maximum number of repeat fields in a sequence of M frames m is equal to 2. Thus, B frames are delayed 8 field times between the time they are captured and the time they are submitted for encoding. As shown, B frames B0 and B1, which precede all encoding and decoding pauses, are delayed 8 field times from the time at which capture of these frames beings to the time at which encoding of these frames begins. Likewise, frames B6 and B7, which are encoded after an encoding delay of one field and are decoded after a decoding delay of one field, are also delayed for 8 field times after capture before they are submitted for encoding. On the other hand, the delay between capturing a reference (I or P) frame is m−p fields, where p is the number of decoding pauses between the time this reference frame is decoded and the time the next reference frame is decoded. In FIG. 17, the delay between the beginning of capture of frame I2 and the beginning of encoding of frame I2 is 2 field times because p=0 (decoding does not pause between decoding frame I2 and the next reference frame P5). Likewise, the delay between the beginning of capture of frame P5 and the beginning of encoding of frame P5 is also 2 field times because p=0 (decoding does not pause between decoding frame P5 and the next reference frame P8). However, the delay between the beginning of capture of frame P8 and the encoding of frame P8 is 0 field times because p=2. In this latter example, decoding pauses twice between decoding frame P8 and decoding the next reference frame P11, namely, once after decoding frame P8 and once after decoding frame B7.

The above rule can be generalized for a pipeline with S processing stages: A B frame will be delayed 2M+m+c field times, where the constant c=2(S−1) (and thus the delay is 2(M+S−1)+m) fields between the time at which capture of the B frame begins and the time at which encoding of the B frame begins. A reference frame will be delayed m−p+c field times (i.e., 2(S−1)+m−p fields) between the time at which capture of the reference frame begins and the time at which encoding of the reference frame begins. Moreover, if, as in the example of FIG. 15, each processing stage pauses processing in between the same frames at which a decoder would pause decoding, then processing for stage s ($1 \leq s \leq S$) of a B frame will be delayed 2(M+s−1)+m field times between the time at which capture of the B frame begins and the time at which processing of the B frame in the stage s begins. A reference frame will be delayed 2(s−1)+m−p fields between the time at which capture of the reference frame begins and the time at which processing of the reference frame in the stage s begins. In FIG. 15, s=1 for ME1, s=2 for ME2 and s=3 for the final encode stage.

Use of the encoder 114' with repeat field delay matcher 127 (FIG. 13) requires more memory than the encoders 114-1 to 114-k in the statistical multiplexer 100 with delay calculators 120-1 to 120-k (FIG. 11). This is because captured frames must be stored for a longer period of time (i.e, as much as 2·M+m field times) after inverse telecine processing pending encoding. In total, a single frame pipeline encoder 114' with repeat field delay matcher 127 requires enough memory for storing 10 fields (assuming M=3, m=2 and 2 fields must be stored for inverse telecine processing). On the other hand, a single frame pipeline encoder, e.g., encoder 114-2, in the statistical multiplexer 100 only requires enough memory for storing 8 fields (under the same assumptions).

Nevertheless, the encoder 114' produces superior quality encoded pictures when used in a statistical multiplexer 10 or 100 versus an encoder 114-1 to 114-k with delay calculator 120-1 to 120-k. This is because the encoder 114' does not simply compensate for delay variations (as do the delay calculators 120-1 to 120-k). Rather, the encoding to decoding delay is the same for all frames encoded by the encoder 114'. As such the encoder 114' can use each newly allocated bit rate immediately. For instance, if the encoder 114' detects increased picture complexity, this is reflected in the statistics provided to the statistics computer 18 or 118. In response, the encoder 114' is allocated an increased bit rate. This allocated bit rate can be implemented by the encoder 114' as soon as it is received and without further delay. By using the increased bit rate immediately, the encoder 114' is able to allocate more bits per picture sooner which results in higher quality pictures reconstructed from the video signal for which the increased bit rate is used. In contrast, the delay calculators 120-1 to 120-k impose a variable delay time on newly allocated bit rates which can delay use of the newly allocated bit rate by the respective encoder 114-1 to 114-k for one or more field times.

The above discussion is intended to be merely illustrative of the invention. Those having ordinary skill in the art may devise numerous alternative embodiments without departing from the spirit and scope of the following claims.

The claimed invention is:

1. A process for encoding a digital video signal comprising the steps of:

(a) processing fields of said digital signal to detect repeat fields, (b) organizing adjacent pairs of said fields other than said repeat fields into frames, (c) determining whether to encode each of said frames as an intraframe, a predicted frame or a bidirectionally predicted frame, (d) encoding said frames in a specific, predefined order relative to the order of capture of said frames and the type of frame as determined in step (c), (e) after each bidirectionally predicted frame that precedes one of said detected repeat fields, delaying encoding of a frame for one field time, and (f) delaying, for one field time, encoding of a frame that follows a first reference frame if said first reference frame is the next reference frame encoded after encoding a second reference frame that precedes a repeated field.

2. The method of claim 1 wherein each bidirectionally predicted frame is encoded after a fixed delay following capture.

3. The method of claim 1 further comprising the steps of:
(g) gathering statistics on said digital video signal and at least one other digital video signal,
(h) allocating a bit rate to said encoded digital video signal based on said gathered statistics, and
(i) encoding said frames in said step (d) in accordance with a model decoder buffer filling with said encoded video signal at said allocated bit rate.

4. The method of claim 1 wherein a delay between capturing and encoding is 2M+m+c fields for each bidirectionally predicted picture and m−p+c fields for each reference picture where M is the inter-reference frame spacing, m is the maximum number of repeat fields that can occur in a sequence of M frames, p is the number of times a decoder is presumed to pause between decoding said reference picture and decoding the next reference picture and c is a constant.

5. An apparatus for encoding a digital video signal comprising:
(a) an inverse teleciner for processing fields of said digital signal to detect repeat fields,
(b) a picture organizer and type selector for organizing adjacent pairs of said fields other than said repeat fields into frames, and for determining whether to encode each of said frames as an intraframe, a predicted frame or a bidirectionally predicted frame,
(c) a compressor for encoding said frames in a specific, predefined order relative to the order of capture of said frames and the type of frame as determined by said picture organizer and type selector, and
(d) a repeat field delay matcher for, after each bidirectionally predicted frame that precedes one of said detected repeat fields, delaying encoding of a frame for one field time, and also for delaying, for one field, encoding of a frame that follows a first reference frame if said first reference frame is the next reference frame encoded after encoding a second reference frame that precedes a repeated field.

6. The apparatus of claim 5 wherein each bidirectionally predicted frame is encoded after a fixed delay following capture.

7. The apparatus of claim 5 further comprising:
(e) a statistics computer for gathering statistics on said digital video signal and at least one other digital video signal, and allocating a bit rate to said encoded digital video signal based on said gathered statistics,
wherein said compressor encodes said frames in accordance with a model decoder buffer filling with said encoded video signal at said allocated bit rate.

8. The apparatus of claim 5 wherein a delay between capturing and encoding is 2M+m+c fields for each bidirectionally predicted picture and m−p+c fields for each reference picture where M is the inter-reference frame spacing, m is the maximum number of repeat fields that can occur in a sequence of M frames, p is the number of times a decoder is presumed to pause between decoding said reference picture and decoding the next reference picture and c is a constant.

9. A method for statistically multiplexing multiple encoded digital video signals into one or more fixed bit rate communication channels comprising the steps of:
(a) gathering statistics on one or more of said encoded digital video signals,
(b) based on said gathered statistics, allocating bit rates for transmitting one or more of said digital video signals as encoded,
(c) encoding one of said digital video signals to produce a certain number of bits for each encoded picture in accordance with a decoder buffer model having a predefined size and filling at a certain bit rate, and
(d) delaying updating said certain bit rate with said bit rate allocated to said one digital video signal by a certain number of field display times depending on the number of times encoding pauses, and a presumed number of times decoding pauses, as a result of detected repeat fields,
(e) wherein encoding of a frame, that follows a first reference frame, is delayed for one field time, if said first reference frame is the next reference frame encoded after encoding a second reference frame that precedes a repeated field.

10. The method of claim 9 further comprising the steps of:
(e) processing pictures of said one digital video signal to detect repeat fields,
(f) pausing encoding for one field time for each detected repeat field, and
(g) calculating said delay as a function of encoding pauses and presumed decoding pauses.

11. The method of claim 9 wherein said delay at the start of encoding a frame equals a constant plus the number of field times during which decoding is presumed to pause for each previously encoded frame minus the number of field times during which encoding pauses prior to said start of encoding said frame.

12. The method of claim 9 wherein after each bidirectionally predicted frame that precedes one of said detected repeat fields, encoding of a frame is delayed for one field time.

13. An apparatus for statistically multiplexing multiple encoded digital video signals into one or more fixed bit rate communication channels comprising:
(a) a statistics computer for gathering statistics on one or more of said encoded digital video signals, and, based on said gathered statistics, for allocating bit rates for transmitting one or more of said digital video signals as encoded,
(b) an encoder for encoding one of said digital video signals to produce a certain number of bits for each encoded picture in accordance with a decoder buffer model having a predefined size and filling at a certain bit rate, and
(c) a delay calculator for delaying updating said certain bit rate with said bit rate allocated to said one digital video signal by a certain number of field display times depending on the number of times encoding pauses, and a presumed number of times decoding pauses, as a result of detected repeat fields, and wherein encoding of a frame, that follows a first reference frame, is delayed for one field time, if said first reference frame is the next reference frame encoded after encoding a second reference frame that precedes a repeated field.

14. The apparatus of claim 13 wherein after each bidirectionally predicted frame that precedes one of said detected repeat fields, encoding of a frame is delayed for one field time.

* * * * *